(12) United States Patent
Edwards et al.

(10) Patent No.: US 7,774,271 B1
(45) Date of Patent: Aug. 10, 2010

(54) ELECTRONIC FINANCIAL MANAGEMENT AND ANALYSIS SYSTEM AND RELATED METHODS

(75) Inventors: Duane S. Edwards, Seattle, WA (US); Michael G. Chalcraft, Seattle, WA (US); Derek J. Edwards, Edmonds, WA (US)

(73) Assignee: Globys, Inc., Seattle, WA (US)

( * ) Notice: Subject to any disclaimer, the term of this patent is extended or adjusted under 35 U.S.C. 154(b) by 0 days.

(21) Appl. No.: 11/382,230

(22) Filed: May 8, 2006

Related U.S. Application Data

(62) Division of application No. 09/619,248, filed on Jul. 19, 2000.

(51) Int. Cl.
*G06Q 40/00* (2006.01)

(52) U.S. Cl. .......................... 705/38; 705/39

(58) Field of Classification Search .............. 705/38–40
See application file for complete search history.

(56) References Cited

U.S. PATENT DOCUMENTS

| | | | |
|---|---|---|---|
| 4,829,426 A | 5/1989 | Burt | |
| 5,182,793 A | 1/1993 | Alexander et al. | |
| 5,287,270 A | 2/1994 | Hardy et al. | |
| 5,325,290 A | 6/1994 | Cauffman et al. | |
| 5,483,445 A | 1/1996 | Pickering | |
| 5,521,364 A | 5/1996 | Kimura et al. | |
| 5,537,314 A | 7/1996 | Kanter | |
| 5,583,763 A | 12/1996 | Atcheson et al. | |
| 5,655,085 A | 8/1997 | Ryan et al. | |
| 5,684,963 A | 11/1997 | Clement | |
| 5,684,965 A | 11/1997 | Pickering | |
| 5,699,528 A | 12/1997 | Hogan | |
| 5,765,144 A | 6/1998 | Larche et al. | |
| 5,768,142 A | 6/1998 | Jacobs | |
| 5,794,207 A | 8/1998 | Walker et al. | |
| 5,802,502 A | 9/1998 | Gell et al. | |
| 5,832,460 A | 11/1998 | Bednar et al. | |
| 5,862,203 A | 1/1999 | Wulkan et al. | |
| 5,873,071 A | 2/1999 | Ferstenberg et al. | |
| 5,873,072 A | 2/1999 | Kight et al. | |
| 5,897,621 A | 4/1999 | Boesch et al. | |

(Continued)

FOREIGN PATENT DOCUMENTS

EP          1197433 A1      4/2002

(Continued)

OTHER PUBLICATIONS

U.S. Appl. No. 09/619,248 Non Final Office Action, mailed Jan. 21, 2010, 16 pages.
Sweetland, Phil, "Integrating billing and the internet," Telecommunications (International Edition) v31n6, Jun. 1997, pp. 1-4.
"Cable & Wireless Improves Electronic Billing Nov. 26, 1991," Newsbytes, Nov. 26, 1991, 2 pages.
Freeman, "Keeping 'em happy," 8, 2000; Marketing News v34n10 PP: 21; Dialog file 15, Accession No. 53388340.

(Continued)

*Primary Examiner*—Thu Thao Havan
(74) *Attorney, Agent, or Firm*—Frommer Lawrence & Haug LLP; Jamie L. Wiegand

(57) ABSTRACT

A computing system facilitating electronic bill presentment and payment features for authorized users via a user interface is introduced including an analysis engine. The analysis engine, in response to user interaction with the user interface, selectively performs user-defined analysis on at least a subset of retrieved billing information associated with one or more billers. The analysis engine further generates one or more user-defined report(s) based, at least in part, on the user-defined analysis.

13 Claims, 20 Drawing Sheets

U.S. PATENT DOCUMENTS

| | | | |
|---|---|---|---|
| 5,915,006 A | 6/1999 | Jagadish et al. | |
| 5,918,217 A | 6/1999 | Maggioncalda et al. | |
| 5,920,848 A | 7/1999 | Schutzer et al. | |
| 5,943,656 A | 8/1999 | Crooks et al. | |
| 5,963,910 A | 10/1999 | Ulwick | |
| 5,963,939 A | 10/1999 | McCann et al. | |
| 5,970,130 A | 10/1999 | Katko | |
| 5,978,280 A | 11/1999 | Saripella et al. | |
| 5,978,780 A | 11/1999 | Watson | |
| 5,987,434 A | 11/1999 | Libman | |
| 5,991,310 A | 11/1999 | Katko | |
| 5,991,739 A | 11/1999 | Cupps et al. | |
| 6,009,411 A | 12/1999 | Kepecs | |
| 6,029,195 A | 2/2000 | Herz | |
| 6,035,025 A | 3/2000 | Hanson | |
| 6,035,277 A | 3/2000 | Anbil et al. | |
| 6,070,150 A | 5/2000 | Remington et al. | |
| 6,076,080 A | 6/2000 | Morscheck et al. | |
| 6,078,897 A | 6/2000 | Rubin et al. | |
| 6,119,109 A | 9/2000 | Muratani et al. | |
| 6,292,789 B1 | 9/2001 | Schutzer | |
| 6,311,170 B1 | 10/2001 | Embrey | |
| 6,313,833 B1 | 11/2001 | Knight | |
| 6,360,211 B1 | 3/2002 | Anderson et al. | |
| 6,397,193 B1 | 5/2002 | Walker et al. | |
| 6,412,012 B1 | 6/2002 | Bieganski et al. | |
| 6,463,585 B1 | 10/2002 | Hendricks et al. | |
| 6,493,685 B1 * | 12/2002 | Ensel et al. | 705/40 |
| 6,533,418 B1 | 3/2003 | Izumitani et al. | |
| 6,609,118 B1 | 8/2003 | Khedkar et al. | |
| 6,614,781 B1 * | 9/2003 | Elliott et al. | 370/352 |
| 6,745,229 B1 | 6/2004 | Gobin et al. | |
| 7,136,821 B1 | 11/2006 | Kohavi et al. | |
| 7,472,080 B2 | 12/2008 | Goel | |
| 2001/0032165 A1 | 10/2001 | Friend et al. | |
| 2002/0013631 A1 | 1/2002 | Parunak et al. | |
| 2002/0052803 A1 | 5/2002 | Amidhozour et al. | |
| 2002/0171662 A1 | 11/2002 | Lee | |
| 2003/0088449 A1 | 5/2003 | Menninger | |
| 2005/0261987 A1 | 11/2005 | Bezos et al. | |
| 2006/0178918 A1 | 8/2006 | Mikurak | |
| 2008/0077471 A1 | 3/2008 | Musgrove et al. | |

FOREIGN PATENT DOCUMENTS

| | | |
|---|---|---|
| EP | 1207696 A1 | 5/2002 |
| JP | 11292021 A | 10/1999 |
| JP | 2002334280 A | 11/2002 |

OTHER PUBLICATIONS

International Search Report for International Application No. PCT/US01/03659, mailed on Apr. 27, 2001.

Official Communication for U.S. Appl. No. 09/580,448, mailed on Aug. 5, 2002.

Official Communication for U.S. Appl. No. 09/580,448, mailed on Mar. 3, 2003.

Official Communication for U.S. Appl. No. 09/580,448, mailed on Nov. 5, 2003.

Official Communication for U.S. Appl. No. 09/580,448, mailed on Jun. 2, 2006.

Official Communication for U.S. Appl. No. 09/580,448, mailed on Jan. 24, 2007.

Official Communication for U.S. Appl. No. 09/580,448, mailed on May 7, 2007.

Official Communication for U.S. Appl. No. 09/580,448, mailed on Dec. 19, 2007.

Official Communication for U.S. Appl. No. 09/611,958, mailed on Sep. 12, 2003.

Official Communication for U.S. Appl. No. 09/497,483, mailed on Jun. 17, 2002.

Official Communication for U.S. Appl. No. 09/497 483, mailed on Dec. 4, 2002.

Official Communication for U.S. Appl. No. 09/497,483, mailed on May 30, 2003.

Official Communication for U.S. Appl. No. 09/619,248, mailed on Aug. 6, 2009.

Official Communication for U.S. Appl. No. 09/619,248, mailed on Jan. 12, 2006.

Official Communication for U.S. Appl. No. 09/619,248, mailed on Nov. 14, 2008.

Official Communication for U.S. Appl. No. 09/619,248, mailed on Jun. 23, 2006.

Official Communication for U.S. Appl. No. 09/619,248, mailed on Aug. 23, 2007.

Official Communication for U.S. Appl. No. 09/619,248, mailed on Sep. 2, 2003.

Predictive analytics, Wikipedia, http://en.wkipedia.org/wiki/Predictive_analytics, 11 pages, accessed Aug. 24, 2009.

* cited by examiner

Fig. 4

| Login_ID | Password | Pers_Info | Acct_Name(s) | Acct_Defs | Acct_Code(s) | Geo_Defs | Time_Defs | Category | Call_Gp |
|---|---|---|---|---|---|---|---|---|---|
| 402 | 404 | 406 | 408 | 410 | 412 | 414 | 416 | 418 | 420 |
| | | | | | | | | | |
| | | | | | | | | | |

| Acct_# | Acct_cd | Billed | Cost | Date | Dest_nmbr | Length | Rate | Term_type | Time |
|---|---|---|---|---|---|---|---|---|---|
| 502 | 504 | 506 | 508 | 510 | 512 | 514 | 516 | 518 | 520 |
| | | | | | | | | | |
| | | | | | | | | | |

500

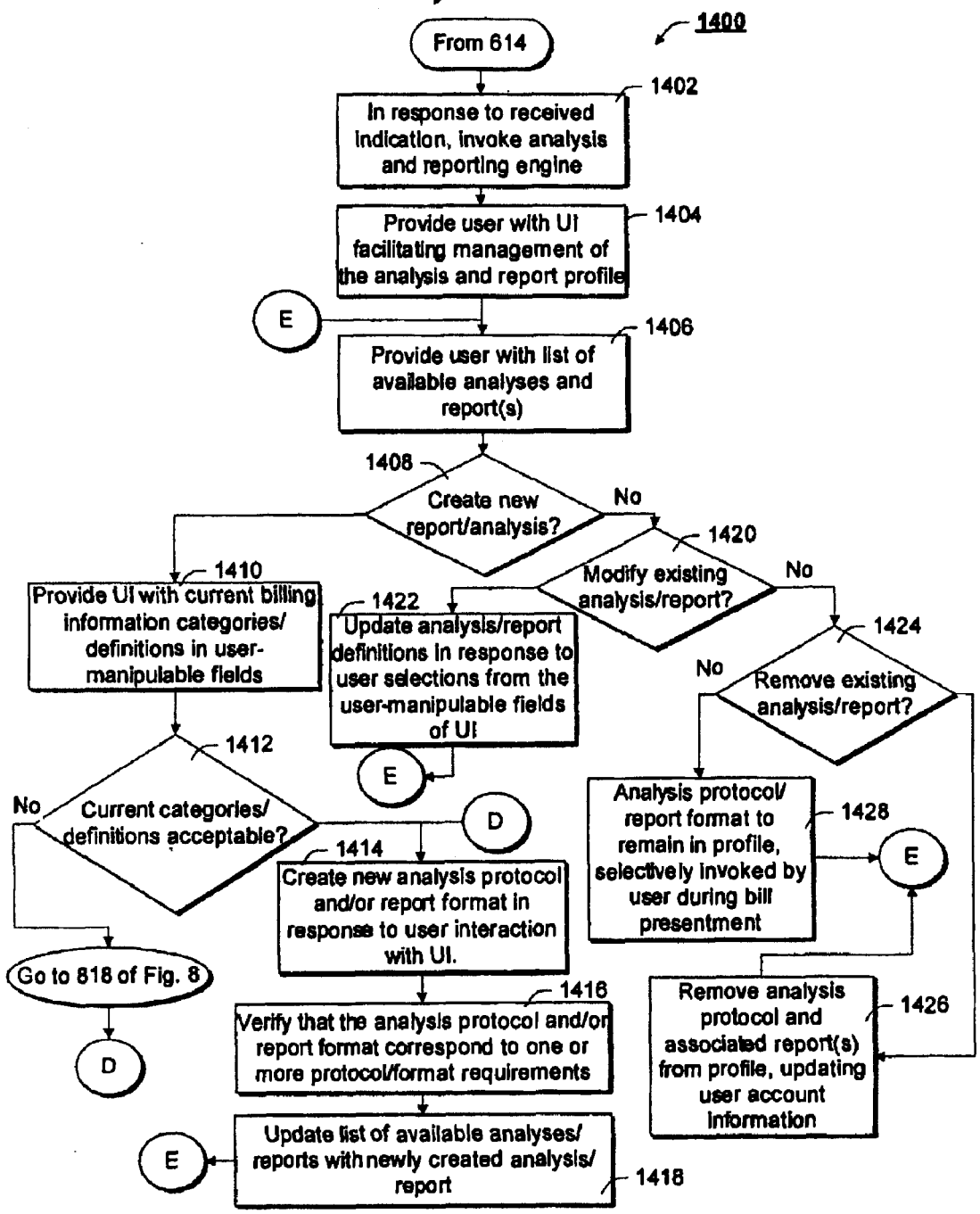

Summary Change - Microsoft Internet Explorer http://www.calvision.com/cv/scripts/sumeOrgRpt.asp?actionForm=chgRID=294&OID=b34OSID=0&noCode=6537536&428

1508
Change the information below and click the OK button. If you do not wish to make any changes, click the Cancel button.

Report: [Account Code Summary] — 1502

Group: [Account Code]
Sort by: [Group]    ● Ascending  ○ Descending
Minimum Value: [(None)]  is [0]  (e.g. 5)

Subgroup: [(None)]
Sort by: [Subgroup]    ● Ascending  ○ Descending
Minimum Value: [(None)]  is [0]  (e.g. 5)

Calculate: ☑ Total Calls   ☑ Total Minutes   ☑ Total Cost
          ☑ Average Cost/Call  ☐ Average Cost/Minute  ☐ Average Call Length    }— 1504

Call Method: [All]

Taxes/Surcharges: ☐ Include

Re-rating: [(None)] — 1506

Fig. 16

Fill in the desired information below and click the OK button to create your report.

Report: _____ ← 1602

Group: [Account Code]
Sort by: [Group]  ⦿ Ascending  ○ Descending
Minimum Value: [(None)]  is [___] (e.g. 5)

Subgroup: [(None)]
Sort by: [Subgroup]  ⦿ Ascending  ○ Descending
Minimum Value: [(None)]  is [___] (e.g. 5)

Calculate: ☑ Total Calls    ☑ Total Minutes    ☑ Total Cost
           ☐ Average Cost/Call   ☐ Average Cost/Minute   ☐ Average Call Length Call Method: [All]

Taxes/Surcharges: ☐ Include

Re-rating: [(None)] ← 1606

© 2000 CallVision.com, Inc. CallVision is a registered trademark of CallVision.com, Inc. All Rights Reserved.

| | | | | | | | | |
|---|---|---|---|---|---|---|---|---|
| 34.0 | $3.40 | Long Distance | 613-228-5468 | Ottawa, ON | 253-889-2712 | | Canada | Tuesday |
| 33.8 | $3.38 | Long Distance | 732-501-3859 | Perth Amboy, NJ | 425-455-6727 | Bellevue, WA | Interstate | Friday |
| 33.4 | $4.18 | Toll Free | 503-534-5939 | Lake Oswego, OR | 888-380-2983 | | Interstate | Friday |
| 33.3 | $4.17 | Toll Free | 360-532-9076 | Aberdeen, WA | 888-729-3820 | | Intrastate | Thursday |
| 32.9 | $5.77 | Wireless | 509-622-5905 | Spokane, WA | 206-201-4894 | Times Square, WA | Intrastate | Thursday |
| 32.7 | $8.19 | Calling Card | 425-889-2715 | Kirkland, WA | 124-489-2938691 | | Interstate | Wednesday |
| 32.7 | $3.28 | Long Distance | 908-425-8411 | Elizabeth, NJ | 253-889-2714 | | Interstate | Wednesday |
| 32.6 | $8.15 | Long Distance | 525-694-8893 | | 253-889-2710 | | Mexico | Friday |
| 32.4 | $4.05 | Toll Free | 719-941-1754 | Aguilar, CO | 800-293-9903 | | Interstate | Wednesday |
| 32.3 | $2.43 | Long Distance | 253-606-2847 | Tacoma, WA | 253-889-2712 | | Intrastate | Monday |
| 32.1 | $3.22 | Long Distance | 606-371-2781 | Florence, KY | 253-889-2715 | | Interstate | Friday |
| 31.7 | $7.94 | Calling Card | 425-455-6752 | Bellevue, WA | 124-489-2938691 | | Interstate | Friday |
| 31.7 | $3.97 | Toll Free | 509-988-7024 | Odessa, WA | 877-274-9194 | | Intrastate | Wednesday |
| 31.3 | $3.92 | Toll Free | 605-489-7125 | Chester, SD | 800-743-5894 | | Interstate | Thursday |
| 31.1 | $3.12 | Long Distance | 937-428-5905 | Centerville, OH | 253-889-2714 | | Interstate | Friday |
| 31.1 | $3.90 | Toll Free | 541-345-7299 | Eugene, OR | 800-743-5894 | | Interstate | Thursday |
| 30.9 | $3.87 | Toll Free | 253-835-4894 | Tacoma, WA | 800-743-5894 | | Intrastate | Wednesday |

2002

Page 1 of 80
Previous Page | Next Page 1 2 3 4 5 6 7 8 9 | 10 | 20 | 30 | 40 | 50 | 60 | 80 |

Fig. 21

ELECTRONIC FINANCIAL MANAGEMENT AND ANALYSIS SYSTEM AND RELATED METHODS

CROSS-REFERENCE TO RELATED APPLICATIONS

This application is a divisional patent application of U.S. patent application Ser. No. 09/619,248, filed Jul. 19, 2000, entitled "ELECTRONIC FINANCIAL MANAGEMENT AND ANALYSIS SYSTEM AND RELATED METHODS," and claims the benefit under 35 U.S.C. §121, which is further incorporated herein by reference.

TECHNICAL FIELD

This invention generally relates to data analysis systems and, more particularly, to an electronic financial management and analysis system and related methods.

BACKGROUND

Electronic bill presentment and payment (EBPP) systems are known. Indeed, a number of businesses provide their customers with the opportunity to access billing information electronically, review the bill and electronically settle account debts. As an extension of this service, a number of companies such as, for example, CheckFree Corporation of Atlanta, Ga., accept billing information from a number of businesses for presentment and payment by subscribing consumers. In addition to the inherent convenience of reviewing and paying bills electronically, such services have an added feature of consolidating bills from a number of different creditors (billers) for review and payment from a single location (e.g., a single web-site). The acceptance of such systems has grown at a healthy rate over the last couple of years, as more and more consumers become comfortable with the idea of executing financial transactions over a public data network (e.g., the Internet).

While the EBPP systems have been gaining in popularity with individual consumers, its use by business (or corporate) customers for billing other businesses (or corporate) customers has not grown at the same rate. One reason that corporate customers have been slow to utilize the EBPP services of their purveyors is their need to analyze and track billing information. Take telephone bills, for example. Many telephone companies provide their customers with the option of reviewing and paying their telephone bills online using their, or another company's (e.g., CheckFree) EBPP system. It is to be appreciated, however, that a telephone bill for a corporate customer can be infinitely more complex than that of a typical consumer. Unlike the typical consumer telephone bill, a corporate telephone bill will likely contain several different accounts, each containing hundreds or thousands of telephone extensions (numbers), each with hundreds or thousands of records of phone calls per month. Prior art EBPP systems typically loaded billing information in one of two ways. Some EBPP systems scan physical (paper) bills and simply provide authorized users a view of the scanned image. More sophisticated ones of the prior art EBPP systems electronically receive billing information into a flat database for presentation to users in a predefined format, facilitating payment by the authorized users.

In addition to the foregoing technical limitations, presenting such vast amounts of information which, inter alia, may well span several hundred pages (or screens) in an easily navigable form is quite difficult. The user-interfaces of prior art EBPP systems were designed to accommodate a typical consumer's billing information, i.e., which may span several pages but is unlikely to extend past, say, ten pages. Accordingly, EBPP systems employ a simple paging system with numeric "hyperlinks" to individual pages of the electronic bill. It is to be appreciated that, with hundreds or thousands of pages, such a paging system paradigm begins to fail when applied to corporate customers. Consequently, many EBPP system providers use a paging system typical of online search engines, wherein the immediate ten (10) pages are available for access, requiring a user to hit a "previous" or "next" hyperlink to view the preceding or succeeding ten pages. Again, when a user needs to access page 110 of a 315 page bill, such a paging system is cumbersome at best.

Moreover, a corporate customer often needs access to the data itself for analysis, re-rating (i.e., where an intermediary business marks up billing information on a line-item by line-item basis for presentation to a third-party customer), and control purposes. While certain prior art systems may manually provide users with the data (e.g., on a CD-ROM) for analysis purposes, such "off-line" systems do not support electronic remittance and do not enable the user to manage billing information (e.g., category names, definitions, etc.). Even more limiting than the user interface, though, is the lack of any substantial analysis capability. Prior art EBPP systems do not provide any substantial analysis tools other than, perhaps, different levels of static detail of the billing information. Similarly, the reporting tools are typically limited to 10 to 60 pre-formatted (or, "canned") reports. It is easy to understand why such analysis services are not provided. First, providing a user with the requisite access to the billing data necessary to perform such analysis presents a security risk and, as such, an unattractive administrative burden on the EBPP provider. Second, the analysis needs vary from EBPP site to site. Thus, an inordinate amount of costly developer time would have to be spent customizing each customer's site with the desired analysis tools. Moreover, these analysis requirements may very well change over time, further consuming development time.

Those skilled in the art will appreciate that each of the foregoing limitations inherently limit the scalability of such prior art EBPP systems, thereby limiting their ability to accommodate the billing requirements of corporate customers.

Thus, an electronic financial management and analysis system and related methods is required, unencumbered by the inherent limitations commonly associated with prior art EBPP systems. Indeed, what is required is an Electronic Bill Presentment, Analysis and Payment (EBPAP) system. Just such a system is introduced below.

SUMMARY

This invention concerns an electronic financial analysis system and related methods. More specifically, the present invention introduces an electronic bill presentment, analysis and payment (EBPAP) system and related methods. According to a first example embodiment, a method comprising receiving billing information at a server from one or more billers for presentment to a plurality of users, and selectively invoking a user-defined analysis of at least a subset of the received billing information associated with a user upon receiving an indication to invoke the analysis by the user is presented. In this regard, the EBPAP system extends prior art EBPP systems to accommodate the management and analysis needs of users, corporate and consumer alike.

According to another aspect of the present invention, an automated password reissuance system is presented. According to this aspect of the invention, when a user forgets their password to access and utilize the services of the EBPAP system, the EBPAP system can automatically generate and securely reissue a password to the user, facilitating subsequent access. According to one implementation, a method is presented comprising receiving an indication from a user including information associated with a registered user. Upon identifying the registered user, a password is dynamically generated and assigned to the registered user, whereupon a message is securely communicated to the registered user at a predefined address. The pre-defined address is established upon the original registration of the user and is, therefore, impervious to attacks by imposters posing as a registered user, i.e., the password message would not be sent to the imposter, but to a location securely accessed by the registered user. According to one implementation, the predefined address is one or more of an email account, a facsimile number, a telephone number, a postal address, an account address, a network address, a business address or a home address.

According to another aspect of the present invention, a rate management utility is provided within the EBPAP system. According to this aspect of the present invention, a corporate user can re-rate (e.g., mark-up or mark-down) billing information received from select billers intended for select third parties (e.g., consumers of the corporate user). An example application is where a law firm utilizes the EBPAP system to further mark-up calls made to or received from select clients. Unlike prior art systems which provided for a re-rating at, say, a private branch exchange, the EBPAP system of the present invention enables users to re-rate the billing information directly.

According to another aspect of the present invention, an innovative paging schema is used throughout the EBPAP system to provide users with convenient access to any page within the billing information. According to this aspect, a hierarchical paging system is employed, with a sliding detail window to provide access to any page in the bill with a minimum of interaction with the bill (e.g., mouse-clicks on hyperlinks).

These and other innovative aspects of the present invention will be evident from the detailed description below.

BRIEF DESCRIPTION OF THE DRAWINGS

The same reference numbers are used throughout the figures to reference like components and features.

FIG. 4 is a graphical illustration of an example data structure comprising user account information;

FIG. 5 is a graphical representation of an example data structure comprising billing information from one or more billers;

FIG. 14 is a flow chart of an example method for analysis and report profile management incorporating the teachings of the present invention;

FIG. 15 is a graphical illustration of an example UI facilitating user modification to an existing analysis protocol and/or report format;

FIG. 16 is a graphical representation of an example UI for creating a new analysis protocol and/or report format;

FIGS. 17A through 17D illustrate example reports generated in response to invocation of one or more analysis protocol(s);

FIG. 20 is a graphical representation of an example UI depicting an innovative paging structure, according to one aspect of the present invention; and FIG. 21 is a storage medium having stored thereon a plurality of executable instructions to implement the financial service center, according to an alternate embodiment of the present invention.

DETAILED DESCRIPTION

This invention concerns an electronic financial management and analysis system and related methods and as such, represents an innovative extension of prior art EBPP systems. In this regard, the present invention overcomes a number of the limitations commonly associated with the prior art, some of which are discussed above. For ease of illustration and explanation, and not limitation, the teachings of the present invention will be developed within the implementation context of a telephone services provider. Thus, the billing information presented in the illustrated examples will pertain to a telephone service provider implementation. It is to be appreciated, however, that the scope of the present invention extends well beyond the particular implementation described. Indeed, in describing the present invention, example network architectures and associated methods will be described with reference to the above drawings. It is noted, however, that modification to the architecture and methods described herein may well be made without deviating from spirit and scope of the present invention. Indeed, such alternate embodiments are anticipated.

EXAMPLE SYSTEM ARCHITECTURE

Example Data Network

Figure 1:
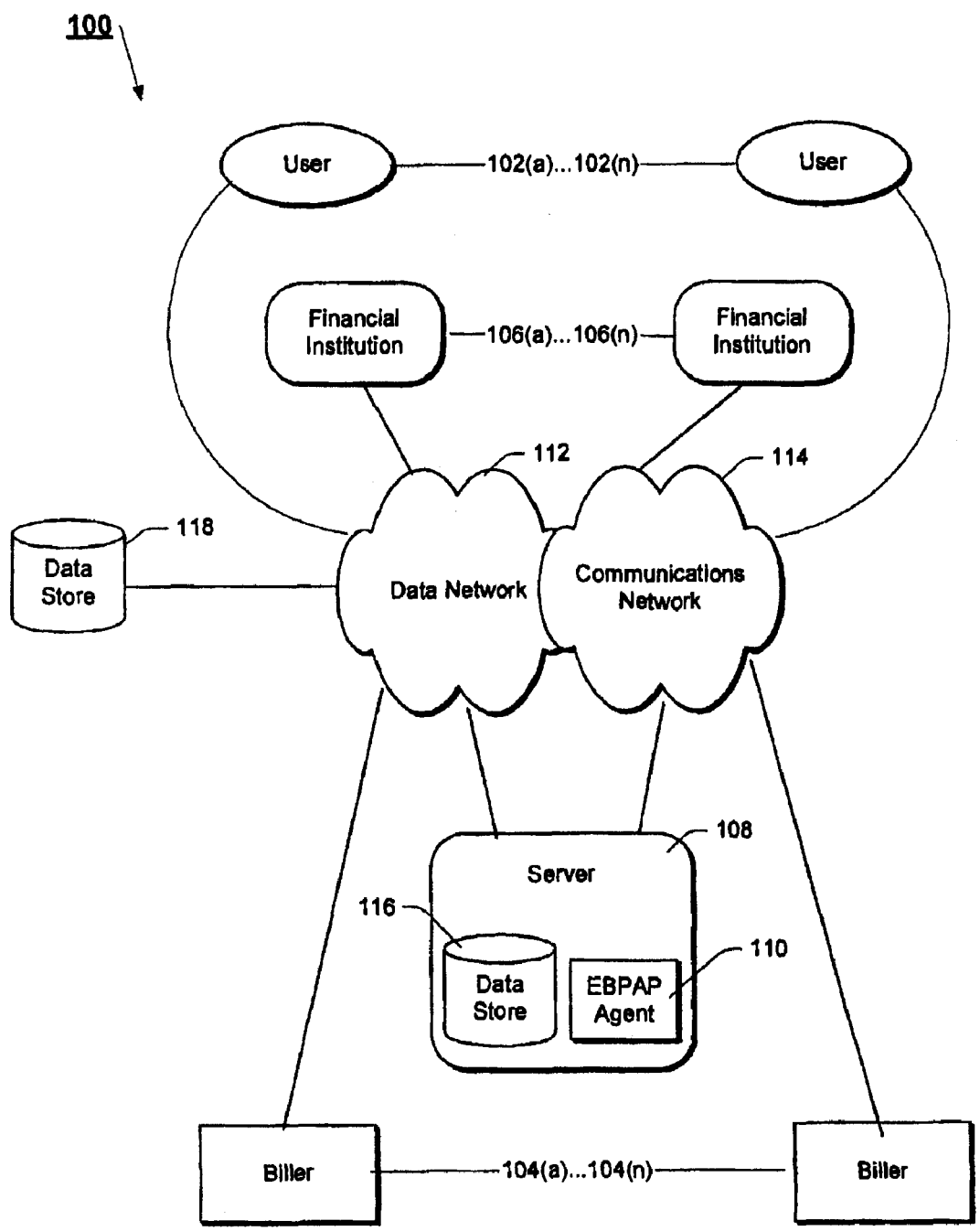
FIG. 1 is a block diagram of a data network facilitating electronic bill presentment, analysis and payment (EBPAP) services.

FIG. 1 illustrates a block diagram of a data network 100 including a server 108 providing financial management and analysis services. More specifically, in accordance with the teachings of the present invention, server 108 includes an EBPAP agent 110 to facilitate the management and analysis of financial information from any of a number of billers. It will be appreciated, based on the description to follow, that server 108 including EBPAP agent 110 may well be provided by one or more biller(s), an independent application service provider (ASP), a financial institution, and the like.

As shown, network 100 is comprised of a number of network participants including user(s) 102(a) . . . 102(n), biller(s) 104(a) . . . 104(n), and financial institutions 106(a) . . . 106(n), each communicatively coupled to one another and server 108 via one or more data network 112 and/or communications network 114, respectively. In addition, network 100 includes a number of data stores including, for example, a data store 116 within server 108, and a data store 118. As used herein, user(s) 102(a) . . . 102(n) are the recipients of electronic billing information via the EBPAP agent 110, while biller(s) 104(a) . . . 104(n) generate billing information. Financial institutions 106(a) . . . 106(n) maintain asset backed accounts which may be used to facilitate financial transactions between the EBPAP provider(s), billers and users. It is to be appreciated, however, that use of financial institution asset backed accounts are not the only way to facilitate financial transactions via the EBPAP agent 110, as other types of accounts may well be used (e.g., credit backed accounts). It is to be appreciated that, as used herein, the label (e.g., user, biller, financial institution) given to a particular network participant at any point in time merely reflects the capacity in which the participant is accessing and utilizing the resources of EBPAP agent 110 and is, in this regard, a dynamic descriptor. That is, at one point a participant may well access the EBPAP center 110 as a user 102(a) . . . 102(n), while at another moment the same participant is a biller 104(a) . . . 104(n) (e.g., as in the re-rating operations scenario described below). Similarly, financial institutions 106(a) . . . 106(n) may, at discrete points, alternatively be a user or a biller.

Moreover, it should be appreciated that each of the network participants accesses and utilizes the resources of network 100 through a computing platform. Accordingly, for purposes of this discussion, use of the term "business", "biller", "financial institution", "user" or "network user" are each intended to represent the respective entity as well as their computing interface. As used herein the computing devices used by participants to access EBPAP agent 110 of server 108 are intended to represent a broad range of computing devices known in the art. Indeed, according to an exemplary embodiment, any of a number of alternative computing and/or communications devices may well be used to access EBPAP agent 110, as no special features or capability is required. Rather, EBPAP agent 110 of server 108 selects an appropriate user interface suitable for the accessing computing device. Accordingly, computing devices such as, but not limited to, personal computers, electronic kiosks, personal digital assistants (PDAs), wireless telephones, wireline telephones, thin-client terminals, and the like may well be used to access and utilize the resources of server 108.

As shown, networks 112 and 114 are intended to represent a wide variety of networks and a wide variety of communication technologies. In this regard, networks 112 and 114 may well include, but are not limited to, public data networks (e.g., the Internet), the Automated Clearing House (ACH) network, communication networks (public switched telephony network (PSTN), cellular telephony network, and the like), private networks (enterprise wide area networks (WAN), data networks, and the like). Similarly, data stores 116 and 118 are each intended to represent any of a number of alternative storage media/devices known in the art. According to one example implementation, one or more data stores (116, 118) are used to store billing information generated by billers for presentment, analysis and/or payment by network participants registered to use EBPAP agent 110. Example data structures storing billing information will be described more fully below, with reference to FIGS. 4 and 5.

But for inclusion of the innovative EBPAP agent 110, server 108 is intended to represent any of a number of alternative computing devices communicatively accessible by network participants to utilize the services of EBPAP agent 110. As will be developed more fully below, EBPAP agent 110 provides network participants with a new level of billing information management, analysis and reporting features heretofore unavailable in the electronic bill presentment and payment (EBPP) field. More specifically, the innovative analysis and reporting engine, to be described more fully below, enable a user to modify billing information fields created by the biller; create new analysis protocols using user-defined fields of billing information; modify or remove existing analysis protocols, provided by the EBPAP agent 110 for all registered users, from a user's analysis profile; and/or create, modify or remove reporting formats from a user's report profile. Moreover, certain aspects of the invention, to be described more fully below, innovatively support the scalability of the EBPAP agent 110. Features such as, for example, the automated secure generation and reissuance of forgotten passwords, the ability to re-rate billers' billing information, and an improved paging structure user interface. In this regard, the EBPAP agent 110 provides registered users with a powerful tool to uniquely manage and analyze financial information received from any of a number of billers. It will be appreciated, from the discussion to follow, that the innovative aspects of the EBPAP agent 110 may well be embodied in hardware, e.g., analog or digital circuitry, or in software executed by one or more processor(s) of the computer system(s).

Example Server Architecture

Figure 2:
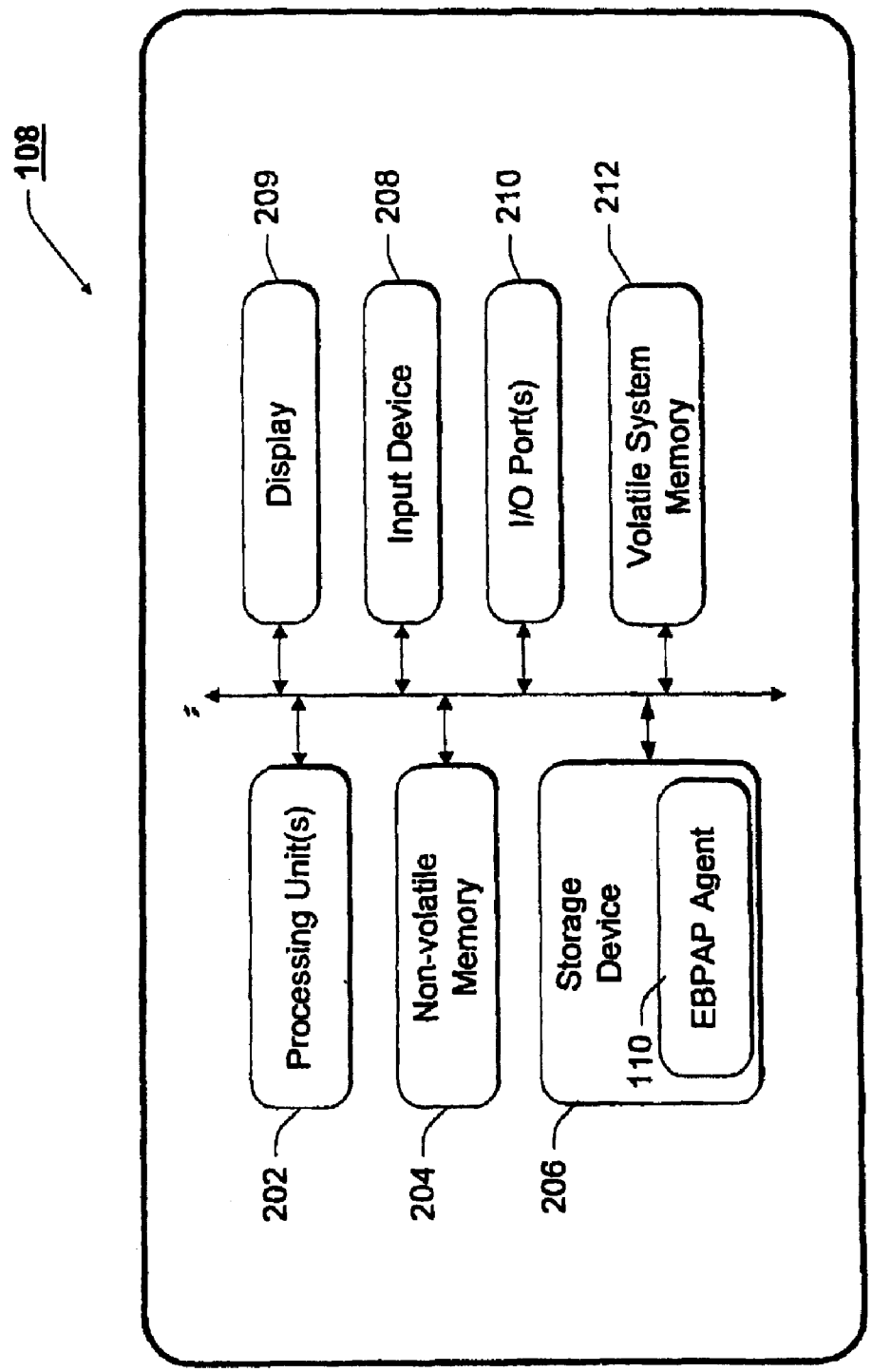
FIG. 2 is a block diagram of an example computing system to implement the EBPAP services of the present invention.

FIG. 2 illustrates a block diagram of an example computing system suitable for use as server 108, hosting the EBPAP agent 110 of the present invention. As introduced above, server 108 is intended to represent any of a plurality of computing devices known in the art. As depicted in the illustrated example embodiment of FIG. 2, server 108 includes one or more processing unit(s) 202, non-volatile memory 204, and a storage device 206 including executable instructions which, when executed by one or more processing unit(s) 202, implement the EBPAP agent 110 of the present invention. Server 108 also includes one or more input/output (I/O) port(s) 210 and a volatile system memory 212. In addition, certain implementations of server 108 include one or more input device 208 and a display 209, coupled as shown. It is to be appreciated that although the EBPAP agent 110 is implemented as a software program, server 108 may alternatively support a hardware implementation as well. In this regard, but for the description of EBPAP agent 110, the following description of server 108 is intended to be merely illustrative, as computer systems of greater or lesser capability may well be substituted without deviating from the spirit and scope of the present invention.

As used herein, processing unit(s) 202 of server 108 are programmed by means of executable instructions stored at different times in the various computer-readable storage media of the computer, e.g., volatile system memory 212, non-volatile memory 204, L1 or L2 cache memory of the processing unit(s) 202 and the like. Application programs, operating systems, and other computing software are usually distributed on removable storage media such as, for example, floppy disks or CD-ROMs. From there, they are installed or loaded into the secondary memory of a computer, e.g., a mass storage device. At execution, they are loaded at least partially into the computer's primary electronic memory. Accordingly, it is to be appreciated that the invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

As used herein, but for the inclusion of EBPAP agent 110, processing unit(s) 202, non-volatile memory 204, storage device 206, input device 208, display 209, I/O port(s) 210 and volatile system memory 212 are each intended to be illustrative of such devices as they are well known in the art. Thus, they need not be described further.

Example EBPAP Agent

Figure 3:
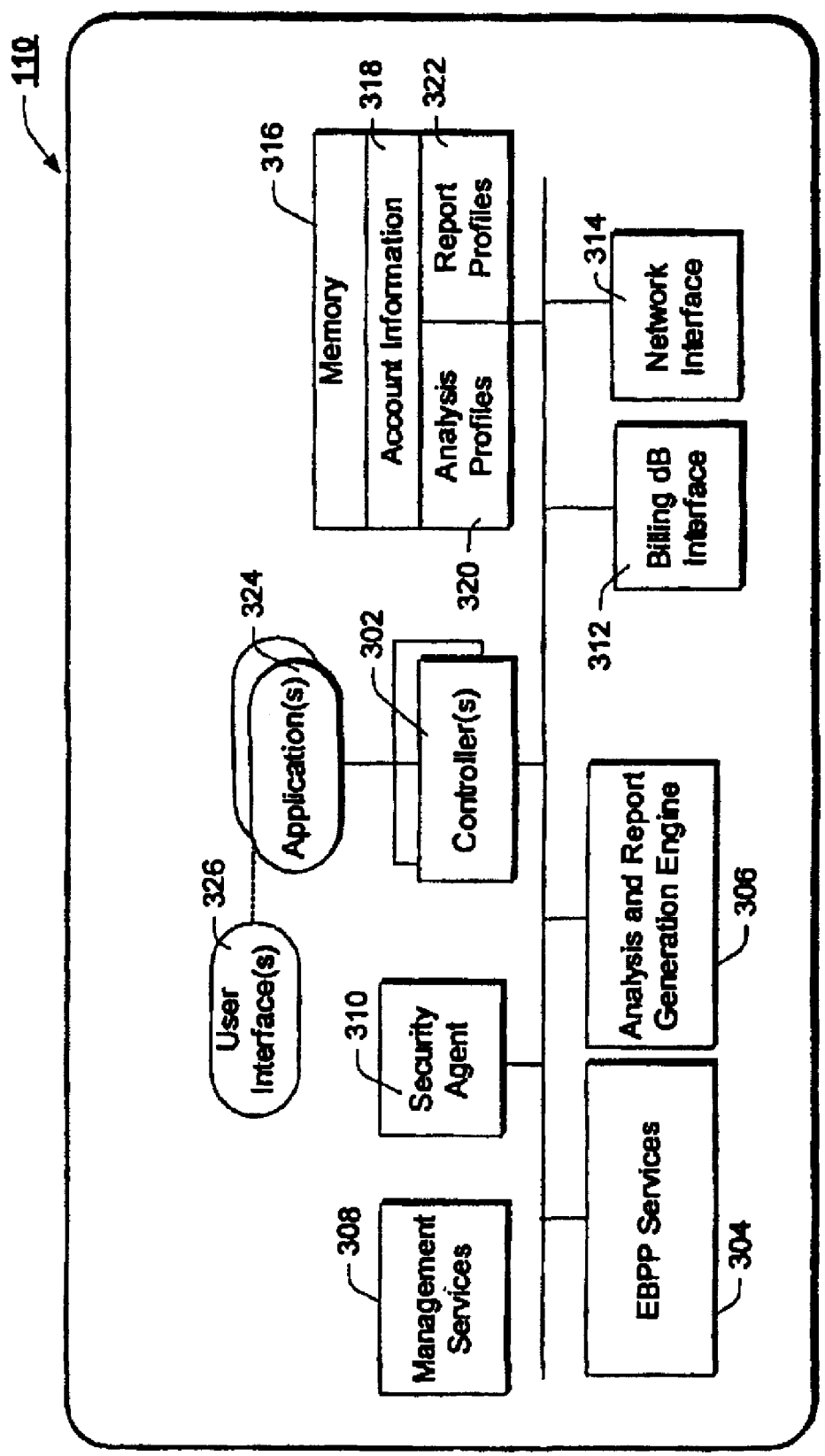
FIG. 3 is a block diagram of an example analysis engine to facilitate user-defined analysis of select financial information, according to the teachings of the present invention.

FIG. 3 illustrates a block diagram of an example electronic bill presentment, analysis and payment (EBPAP) agent 110 incorporating the teachings of the present invention. In accordance with the illustrated example embodiment of FIG. 3, EBPAP agent 110 includes one or more controller(s) 302, EBPP services 304, and an analysis and report generation engine 306, incorporating the teachings of the present invention. In addition, EBPAP agent 110 advantageously includes management services 308 agent and security agent 310, each comprising certain aspects of the present invention, to be described more fully below. EBPAP agent 110 is also depicted comprising a billing database (dB) interface 312 to access billing data store(s), a network interface 314, memory 316 including account information 318 specifying analysis profiles 320 and report profiles 322, and one or more application(s) 324 including, for example, one or more user interface(s) 326, each coupled as shown. For ease of explanation and illustration, and not limitation, EBPAP agent 110 is depicted in FIG. 3 as a plurality of discrete functional blocks. It is to be appreciated, however, that one or more of the individual blocks may well be combined into a single block. Moreover, EBPAP agent 110 may well be implemented as a plurality of executable functions in software which, when executed, implement the services of the financial transaction manager to be described.

As used herein, controller(s) 302 are intended to represent a wide variety of control and processing devices known in the art. Controller(s) 302 manage the invocation of select EBPAP agents and services (304, 306, 308, 310) upon receiving appropriate indications from higher-level resources such as, for example, user interface(s) 326.

EBPP services 304 facilitate the electronic presentment of billing information to users 102(a) . . . 102(n) from billers 104(a) . . . 104(n). In addition, EBPP services 304 enable users 102(a) . . . 102(n) to pay at least a portion of received bills utilizing credit and/or asset backed accounts via the well known credit and/or automated clearing house (ACH) financial transaction system. According to one aspect of the present invention, EBPP services 304 utilizes an innovative presentation method which enables a user to toggle between a detailed view of key information, and a summary view. That is, EBPP services 304 enable an authorized user to "expand" or "collapse" the presented bill to provide a user-defined amount of bill detail. Moreover, the ability to expand/collapse is provided on a line-item by line-item basis and may, in certain embodiments, also provide information describing the nature of the selected billing information. According to one embodiment, for example, expanding on a "tax" billing line item will provide a listing of all of the taxes associated with the received bill. Further selecting a tax line item will provide the user with a screen describing the nature of the tax and, perhaps, means by which the user can reduce or limit their tax liability.

In addition to the innovative expand/collapse feature, EBPP services 304 also provides an innovative paging structure. Unlike the prior art, which simply provides "hyperlinks" to display the immediately surrounding ten (10) pages with "Next" and "Previous" links to view the next/previous ten pages, EBPP services 304 provides a paging hierarchy. According to one implementation, EBPP services 304 divides the pages of the bill into groups of ten (10) (e.g., 10, 20, 30, and so on) for bills under 200 pages, and groups of one hundred (100) for bills over 200 pages (e.g., 100, 200, 300, and so on). Once a particular range of pages is selected (e.g., 30), hyperlinks to 30-39 will be presented in addition to the hyperlinks to 10, 20, 40, 50 and so on. In this way, a user is generally only 2 to 3 "clicks" of the user I/O device (e.g., mouse) away from the billing page of interest. Thus, EBPP services 304 provides some innovative features which facilitate scaling of the EBPP solution for use by corporate customers.

Analysis and report generation engine 306 enables a user to effectively manage, analyze and create custom reports of billing information from one or more billers using the billing information hosted by the biller, financial institution, and/or third-party application service provider (ASP). As used herein, reports may well include textual information, graphical information, geographical distributions, and the like. According to one aspect of the present invention, to be developed more fully below, analysis and report generation engine 306 is selectively invoked by controller(s) 302 to enable a user to establish an analysis and reporting profile comprising one or more analysis protocol(s) and/or one or more report format(s). In accordance with the teachings of the present invention, analysis and report generation engine 306 is used to create custom analysis protocols/report formats based, at least in part, on user-generated definitions and dependencies of the billing information. In addition, analysis and report generation engine 306 can be utilized to modify/remove analysis protocols/report formats from the analysis and report profile. In this regard, analysis and report generation engine 306 enables a user to analyze electronic information (e.g., billing information, call information, re-rating information, account information, and the like) at the source of such information and create custom reports, utilizing user-defined fields and dependencies established via management services 308.

As introduced above, management services 308 facilitates a number of account management functions including, for example, management of user profile information, management of payment and/or payment authorization information, and the customization of definitions and dependencies of billing account information facilitating user-defined analyses and/or report formats. Management services 308 enables a user to access the billing information and modify account information and dependencies, field definitions, analysis profiles and reporting formats. That is, the management services 308 enables authorized users to access and manipulate billing information at the server 108, i.e., without the prior art need of downloading the billing information to a local client computing device. Authorized users can establish billing information field dependencies within the billing information database for analysis and reporting purposes. In this regard, management services 308 fosters unprecedented access to and control over billing information at the source.

As used herein, each user account minimally includes at least one user identifier and associated password. According to an exemplary implementation, the user account also includes one or more references to personal information such as, for example, place of birth (e.g., one or more of city, state, province, country), month/day of birth, home zip code, postal address, mother's maiden name, email address, telephone number, facsimile number, and the like. According to one implementation, management services 308 agent supports a hierarchy of users including, for example, master-users and basic-users. Such an implementation would be common, for example, with a corporate customer wherein the master-user would have full access and authority to review, analyze and generate reports for all billing information associated with one or more accounts of the corporate customer, to pay bills, etc. The basic-user has more limited access and authority privileges dictated by the master-user, to review and analyze the billing information or, perhaps, only a subset of the billing information associated with the corporate customer.

According to one aspect of the present invention, management services 308 enables a user to create and manage sub-accounts, to establish user profiles with different access rights to each of the different sub-accounts, and to manage payment authorization information. Implementation of the user hierarchy and the ability to create sub-accounts by management services 308 facilitates the scalable financial management and analysis tool required to support larger corporate customers.

Security agent 310 provides the security features of the EBPAP agent 110. It will be appreciated that communicating personal and financial information over potentially public data networks requires that steps be taken to preserve the confidential nature of such information. According to one innovative aspect of the present invention, to be developed more fully below, security agent 310 enables a user to decide (reflected in the user profile, for example) the level of security taken to preserve different sets of information. One user may decide, for example, that the transmission of billing information can occur over an unsecure communication link, whereas financial account information and/or personal information should minimally be encrypted and preferably be transmitted via a secure socket layer (SSL) connection from the user to the EBPAP agent 110. In this regard, security agent 310 may well include support for any of a number of alternative encryption schemes including, for example, public key/private key encryption, message certification techniques, and the like.

In addition to managing the security of the communication channel, security agent 310 is responsible for authenticating accessing users. According to one example implementation, security agent 310 verifies received user identifier (e.g., a login identity) and password information against account information 318 residing in memory 316. If the accessing user is authenticated, the user is provided access to billing information in accordance with the access privileges identified in the account information 318. If the accessing user is not authenticated, they are not provided access to EBPAP agent 110, and security agent 310 logs the unauthorized attempt to gain access. In one embodiment, if an inordinate number of unsuccessful attempts are made to access particular account information, security agent 310 may generate a flag for a system administrator, security officer, or the like to notify the registered user of the access. According to one implementation, security agent 310 automatically issues an email to the registered email address of the targeted user to notify them of the unauthorized attempts.

In addition to the foregoing security features, security agent 310 provides a secure, automated password "reissuance" feature for users that forget their passwords, in accordance with one aspect of the present invention. If a user forgets their password, security agent 310 presents them with one or more questions based, at least in part, on the information contained in their user profile. If the accessing user is a legitimate user (i.e., he/she did, indeed, merely forget the password and is not an imposter) and is able to provide the security agent 310 with accurate answers to the questions posed, security agent 310 automatically generates a new password for the user and sends the new password to an address/location predefined by an authorized user (i.e., may include a master-user) in the initial set-up of the account (e.g., an email address). In this way, were an imposter able to provide security agent 310 with a correct user-ID and personal information associated with an authorized user, the imposter is not simply provided the new password, as it is instead sent to a personal address/location of the authorized user. Thus, the imposter would also have to gain access to the predefined address/location to retrieve the new password. Thus, it will be appreciated that security agent 310 provides a secure, yet scalable solution to the problem of servicing forgotten passwords.

Billing database (dB) interface 312 and network interface 314 each provide the necessary communications link to data stores (e.g., 116, 118) and the data and communications networks (112, 114 respectively) to support the features of EBPAP agent 110. According to one example implementation, EBPAP agent 110 accesses and retrieves billing information from one or more databases (e.g., a SQL database, an Oracle database, a FoxPro database, an Access database, a LotusNotes database, a Filemaker database, and the like) resident on one or more data stores (116, 118) to facilitate the analysis and reporting features of EBPAP agent 110. Network interface 314 facilitates any communication to/from coupled data and/or communications networks (112, 114).

With continued reference to FIG. 3, memory 316 is shown comprising user account information 318 including default and user-defined analysis profiles 320, as well as default and user-defined report profiles 322. As will be developed more fully below, analysis and report generation engine 306 enables authorized users to modify (i.e., customize) or remove default analysis profiles or reports, as well as create their own analysis profiles or report formats. The profiles created by a user utilizing the analysis and report generation engine 306 are maintained with the account information 318 in the profiles 320 and 322, respectively. An example data structure of user account information is provided with reference to FIG. 4.

Turning briefly to FIG. 4, an example data structure containing user account information is provided, in accordance with one embodiment of the present invention. In accordance with the example embodiment of FIG. 4, data structure 400 is shown comprising a number of fields including, for example, Login_ID 402, password 404, personal information (Pers_

Info) 406, account name (Acct_Name(s)) 408, account definition (Acct_Def(s)) 410, account code (Acct_Code(s)) 412, geographic definition (Geo_Def(s)) 414, time definition (Time_Def(s)) 416, category definition (Category) 418 and call group definition (Call_Gp) 420. According to one aspect of the present invention, EBPAP agent 110 provides user access to the definition of the category fields (402, 404, 406, 408, 410, 412, 414, 416, 418, 420), and what information is represented in those fields. In this regard, EBPAP agent 110 enables a user to define the information to be analyzed and presented to the user, as appropriate to the particular application (e.g., telephone billing (shown), stock room supply management, corporate expense account management, and the like). More specifically, as will be discussed more fully below, EBPAP agent 110 enables a user to select which field information is utilized and the analysis(es) (e.g., statistical analyses, time/date analyses, etc.) to be run in developing user-defined analysis protocols and reports.

In addition to account information 318 and profiles 320, 322, memory 316 may also include billing information (not shown) for analysis and/or reporting purposes by the EBPAP agent 110. According to one implementation, EBPAP agent 110 retrieves select billing information from one or more databases via billing dB interface 312 and stores it locally in, for example, memory 316 for analysis and reporting purposes. In alternate implementations, the retrieved billing information may well be stored within analysis and report generation engine 306 or within a cache (not shown) of controller(s) 302.

In addition to the exemplary functions of EBPAP agent 110 introduced above, EBPAP agent 110 may advantageously include one or more application(s) 324 including, for example, one or more user interface(s) 326. It is to be appreciated that the user interface (UI) 326 provides a user a means of interacting with and controlling the features of EBPAP agent 110. As alluded to above, user interface 326 is intended to accommodate any of a number of different computing devices which may access and utilize the features of EBPAP agent 110. In this regard, UI 326 is intended to represent any of a number of audio and/or visual user interfaces commonly known in the art. In one embodiment, for example, user interface 326 is comprised of a plurality of executable instructions which are communicated to a computing device accessing the EBPAP agent 110 to render a web page on a display of the computing device. In an alternate embodiment, user interface 326 is comprised of a touch-tone response system, wherein a user of a telephony device may interact with and selectively control the features and services of EBPAP agent 110. Depending on the detected capability of the computing device used to access the system, and the nature of the interfacing data and communications networks (112, 114), user interface(s) 326 may be transmitted in an encrypted form to protect the sensitive nature of a user's account information. In the web page embodiment, described above, the web page would typically be encrypted according to security agent 310 settings and sent to the accessing computing device.

Given the foregoing introduction, it is to be appreciated that EBPAP agent 110 overcomes the inherent technical, scalability and analysis limitations of prior art EBPP systems, thereby providing a powerful financial management and analysis enterprise solution for individual and corporate customers alike.

Example Data Structures

As used herein, data stores 116 and 118 are each intended to represent any of a number of storage devices/media for storing data structures. For example, data store 116, 118 may well be comprised of one or more of a floppy disk within a floppy disk drive, a hard disk drive, a redundant array of independent drives (RAID) system, a compact disk (CD) inserted within an accessible CD player, a digital versatile disk (DVD) inserted within an accessible DVD player, a magnetic tape within a tape drive, and the like. Such storage devices/media are well known to those skilled in the art and, thus, need not be described further.

As introduced above, the EBPAP agent 110 accesses and retrieves select billing information from one or more data stores, e.g., data store 116, 118, for presentation, analysis, report generation and payment by authorized users. An example data structure of billing information is presented with reference to FIG. 5, below.

FIG. 5 graphically illustrates an example data structure populated with billing information, in accordance with an example embodiment of the present invention. As introduced above, billing data structure may well be located in one or more of data stores 116 and/or 118. Moreover, according to one exemplary implementation, data structure 500 may actually be distributed as a number of individually linked data structures across such data stores. That is, although depicted as a flat data structure, this is for ease of illustration and discussion, and not intended to limit the scope of the present invention.

In accordance with the illustrated example embodiment of FIG. 5, billing data structure 500 is comprised of a number of fields including, for example, account number (Acct_#) 502, account code (Acct_cd) 504, billed information (Billed) 506, cost information (Cost) 508, date 510, destination number (Dest_nmbr) 512, call duration (Length) 514, rate information (Rate) 516, call type (Term_type) 518 and time information (Time) 520. According to one implementation, EBPAP agent 110 enables users to (re)define the fields in the billing data structure 500 to suit a particular application (e.g., telephone billing (shown), stock room supplies, corporate account management, etc.). In this regard, EBPAP agent 110 provides unprecedented access and management of information retained at billing information server 108.

As introduced above, in accordance with one example embodiment, data structure 500 is at least a subset of an example database comprising billing information. In accordance with the teachings of the present invention, controller 302, via billing dB interface 312, issues commands to retrieve information from and save information to the source of billing information. It is to be appreciated, however, that alternative database systems may well be substituted for the database without deviating from the spirit and scope of the present invention.

Example Operation and Implementation

Having introduced the operating environment and functional elements of the innovative EBPAP agent 110 with reference to FIGS. 1 through 5, above, the operation of the system will now be developed more fully below with reference to FIGS. 6 through 21.

As alluded to above, the EBPAP agent 110 utilizes a user identifier and password combination to identify and authenticate users of the system. Thus, when first accessing the EBPAP agent 110, a user must enter a valid user_ID and password before they may proceed to utilize the services of EBPAP agent 110. As will be developed in greater detail below, security agent 310 establishes a communication channel in accordance with a user-defined security level noted in the user's account information. Regardless of the default security level established upon registration, whenever a user is working with financial account information and/or personal information security agent 310 establishes a secure communication channel using the secure hypertext transfer protocol (HTTPS) via the secure socket layer (SSL). Thus, EBPAP agent 110 and security agent 310 ensure that the truly confidential information associated with a user is protected, even if the user does not request a secure communication channel.

EBPAP Agent Invocation and Control

Figure 6:
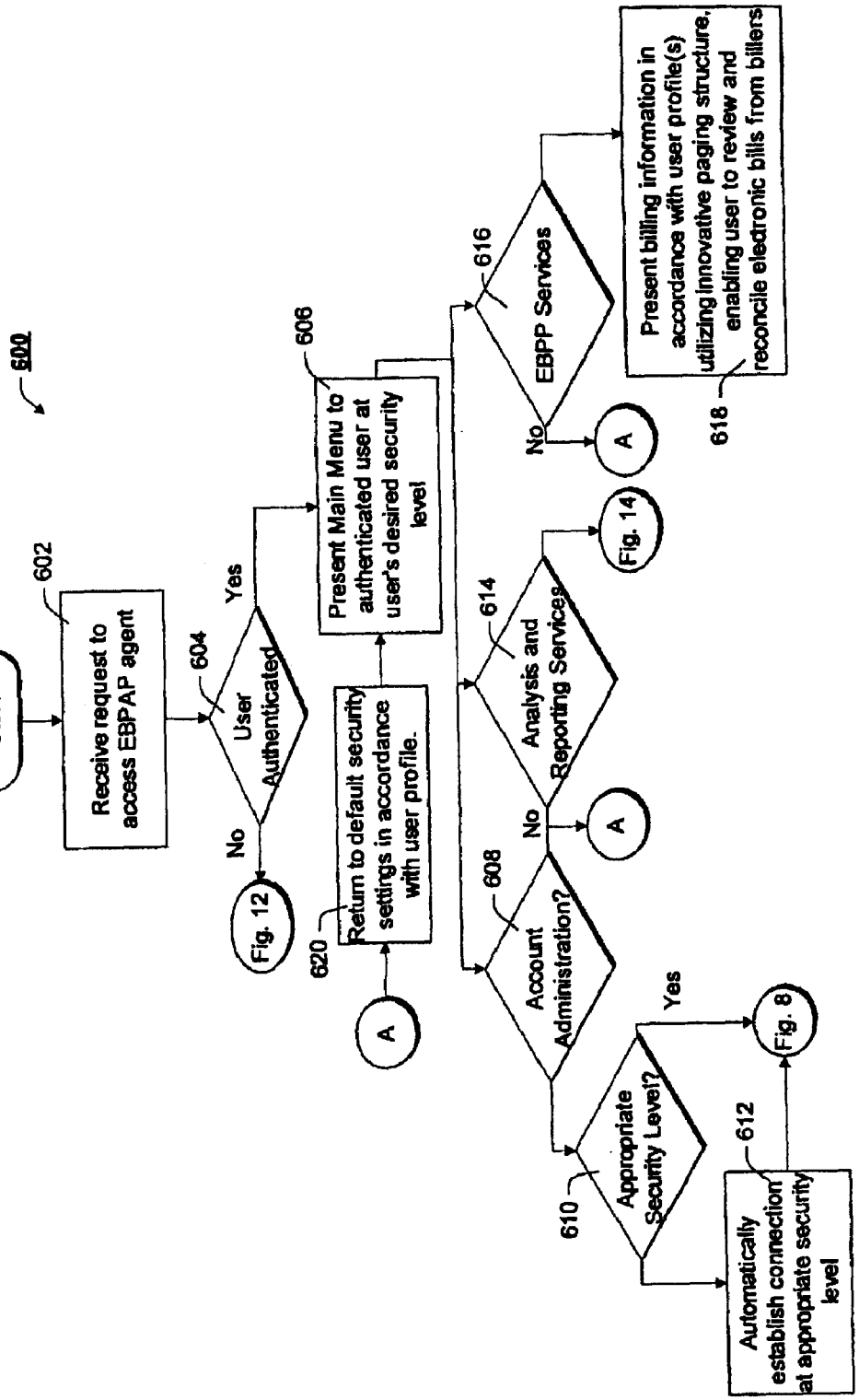
FIG. 6 is a flow chart of an example method for accessing and selectively invoking EBPAP resources, according to one example embodiment.

FIG. 6 illustrates a flow chart of an example method for invoking and controlling the financial management and analysis services of EBPAP agent 110, in accordance with one example embodiment of the present invention. As shown, the method begins with block 602 wherein server 108 receives a request from a user to access EBPAP agent 110. In response, server 108 passes the request to controller 302, which selectively invokes security agent 310 to authenticate the user_ID and password received in the access request, block 604. If the security agent 310 is unable to authenticate the requesting user in block 604, the process proceeds to the security agent 310 services denoted in FIG. 12 (discussed in greater detail below).

If, in block 604, security agent 310 is able to authenticate the user_ID and password, controller(s) 302 selectively invokes an instance of user interface(s) 326 for presentation to the requesting user. An example of a suitable graphical user interface is presented with reference to FIG. 7, below.

Figure 7:
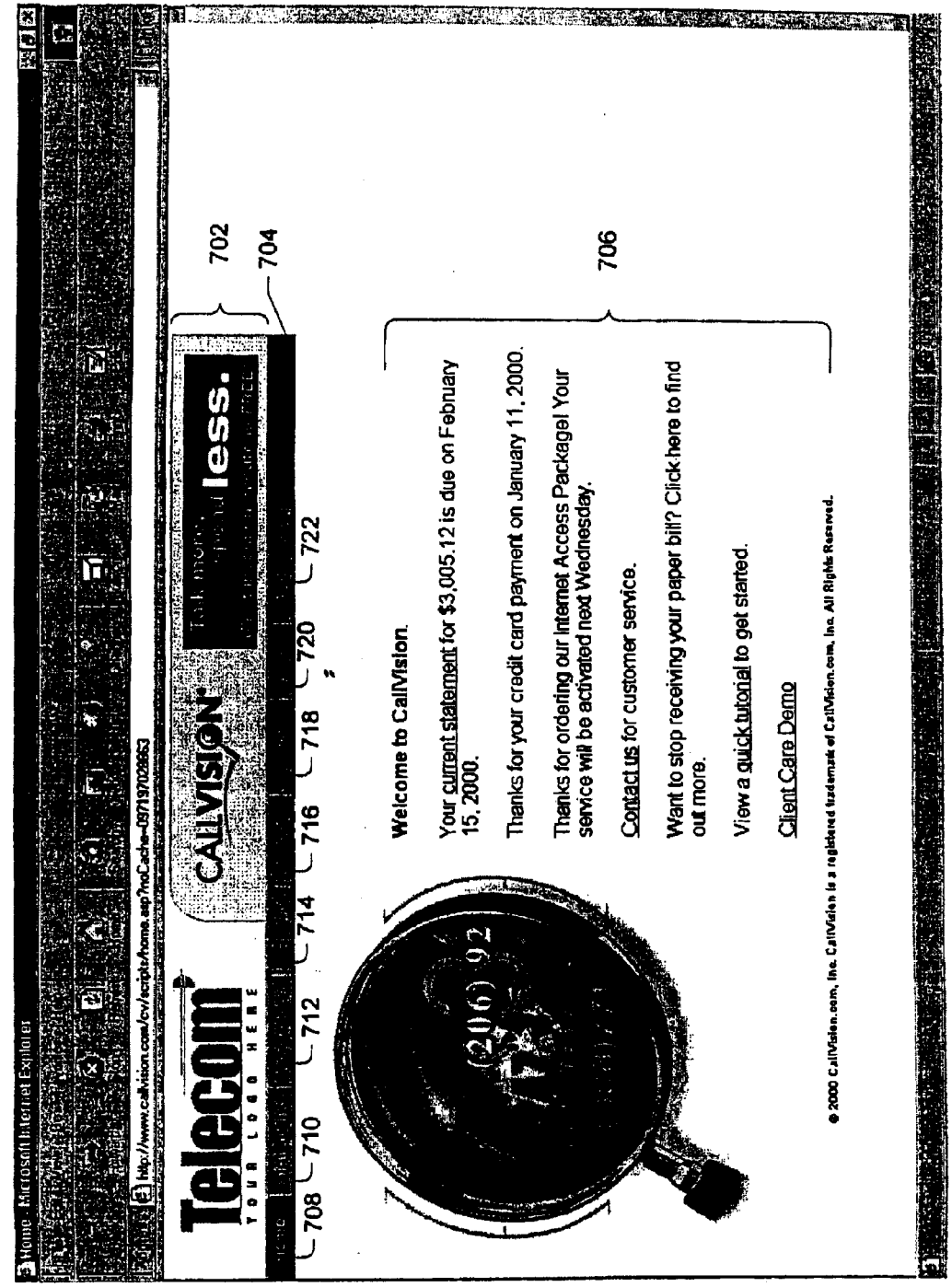
FIG. 7 is a graphical illustration of an example user interface (UI) facilitating user interaction with the EBPAP system, according to one example implementation.

Briefly, FIG. 7 depicts an example illustration of a graphical user interface (UI) 700 suitable for use in accordance with the present invention. In this example implementation, the UI 700 is written in a "markup language", such as HTML (Hypertext Markup Language), application server pages (ASP), extensible markup language (XML), and the like. It is to be appreciated, however, that the scope of the present invention is not limited to particular coding embodiments and, as such, alternative languages may well be used in implementing the teachings of the present invention. The UI 700 is rendered by an Internet browser application, such as the Internet Explorer browser from Microsoft Corporation, which executes on the accessing user's computing/communication device.

In accordance with the illustrated example embodiment of FIG. 7, a web page comprising a banner (or, header) field 702, a menu (or, navigation) bar 704 and a message field 706 is provided. The banner field 702 will typically provide the name of the EBPAP service provider, or biller. In addition, controller(s) 302 may further customize the banner field 702 with user-specific information such as, for example, advertisements, birthday greetings, special offers, coupons, and the like.

The menu/navigation bar 704 is shown comprising hyperlinks to a number of EBPAP features. More specifically, user selection of one or more of the buttons on the menu bar selectively invokes an associated feature of EBPAP agent 110. According to one implementation, for example, selection of the statement 710, summary 712 or detail 714 buttons selectively invokes one or more aspects of the EBPP service 304. In certain embodiments, selection of statement, summary or detail buttons (710, 712, 714) automatically invokes an instance of analysis and report generation engine 306 to dynamically retrieve, analyze and present the requested information in a user-defined format. Thus, it is to be appreciated that analysis and report generation engine 306 may well be invoked directly by a user, i.e., to execute a particular analysis, or by another element of EBPAP agent 110 to fulfill another request. Selection of the graph button 716 enables a user to define and/or generate a report or graph. Selection of the settings button 718 invokes another page from which the user can modify account settings (i.e., selectively invoking management services 308) or analysis and report profile settings (i.e., selectively invoking analysis and report generation engine 306). Selection of the help button 720 selectively invokes an interactive assistant that provides answers to questions regarding one or more of billing information, using the analysis and report generation engine 306, security questions, registration and account questions, and the like. According to one embodiment, controller 302 receives the query and invokes a help application 324 (not specifically denoted) to handle users' requests. The feedback button 722 selectively invokes an email service that enables the user to enter a question, comment or query and send it automatically to one or more of a biller, a financial institution, or the EBPAP provider.

In the message field 706, information associated with the management and analysis of one or more accounts (e.g., financial accounts, stock accounts, supply accounts, etc.) is provided. The actual information displayed in the message field 706 depends, at least in part, on the location of the user within the web-site (as denoted on the menu bar 704). As will be detailed below, when the user is in the statement, summary or detail UI, billing information of a certain detail will be presented for the user in message field 706. Alternatively, if the user is in the settings menu of the site, control fields will be presented in the message field enabling the user to further define billing information database fields, link billing fields, define analysis profiles, define report profiles, and/or perform certain administrative tasks (e.g., user profile information). It is to be appreciated that the layout of FIG. 7 is merely intended to be illustrative of one example implementation. Alternative UIs may well be substituted for UI 700 without deviating from the spirit and scope of the present invention.

Returning to the process of FIG. 6, once the main UI 700 is presented to an accessing user in block 606, the user interacts with the UI to selectively invoke one or more features of EBPAP agent 110, blocks 608, 610, 612, 614, 616, 618. More specifically, as alluded to above, selection of buttons 710, 712, 714 selectively invokes an instance of EBPP services 304, while selection of settings 718 provides a user with another UI wherein they can selectively invoke an instance of management services 308 or analysis and report generation engine 306. It is to be appreciated, however, that analysis and report generation engine 306 may also be selectively invoked from within one or more of EBPP services 304 and/or management services 308, as discussed above. The ability to select various functions/services from the main menu 700 is illustrated in the flow chart as decision blocks 608, 614 and 616, respectively. If, for example, a user elects account administration (from the settings menu 718), security agent 310 determines whether a secure communication channel is established, block 610. If not, security agent 310 automatically establishes a connection at an appropriate security level, block 612. According to one implementation, when EBPAP is dealing with personal information (e.g., in the registration process), or with financial account information (e.g., the payment authorization process), security agent 310 establishes a secure communication channel utilizing HTTPS over SSL (as described above). The process of account administration then continues, with a secure connection, in FIG. 8.

In block 614, if the user elects to modify the analysis and/or reporting profiles, the process continues with reference to FIG. 14.

In block 616, if the user elects to utilize the EBPP services of EBPAP agent 110 (i.e., by selecting one of statement 710, summary 712, or detail 714 buttons), controller(s) 302 selectively invokes an instance of EBPP services 304. More specifically, EBPP services 304 generates one or more database queries to access information associated with the requesting user from one or more data stores (116, 118) for presentation to the requesting user, block 618. As described above, EBPP services 304 enables a user to dynamically control the amount of information provided in the bill presentment, and will also enable the user to settle the account. Account settlement is performed through one or more of the ACH or a credit card clearing house.

It is to be appreciated that at any point in the process (or any page in the web-site), a user may return to the main UI 700 by pressing the home 708 button. Indeed, a user may jump to the EBPP services UI by depressing buttons 710, 712, 714; or the administration UI by pressing the settings 718 button from any point in the process (or any page in the web-site).

Registration and Account Administration

Figure 8:
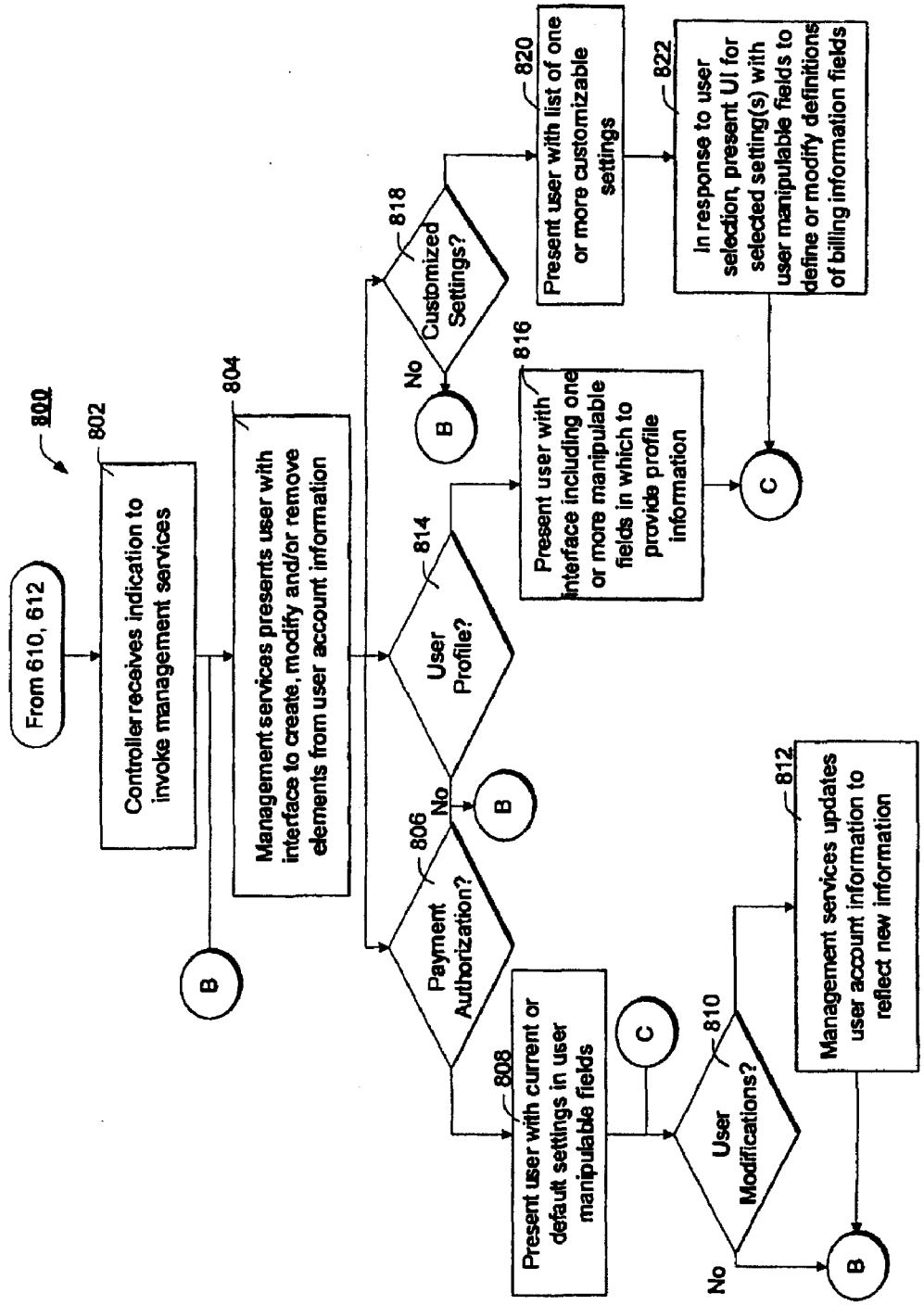
FIG. 8 is a flow chart of an example method for invoking management services of the EBPAP agent.

FIG. 8 illustrates a flow chart of an example method 800 for accessing and selectively invoking the resources of management services 308. As introduced above, management services 308 enables a user to manage payment authorization settings, user profile information and billing information account definitions and dependencies, in accordance with the teachings of the present invention. As above, management of these services is via a user interface. An example of a suitable user interface is provided with reference to FIG. 9.

Figure 9:
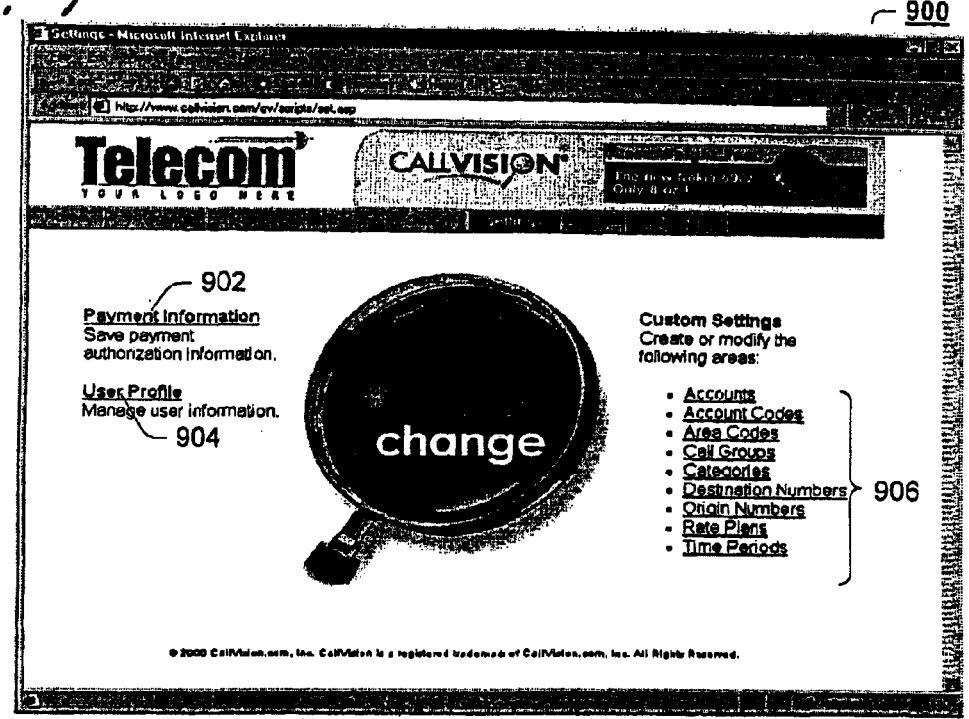
FIG. 9 is a graphical illustration of an example UI enabling a user to selectively invoke one or more management services, in accordance with one example implementation.

FIG. 9 graphically illustrates an example management services UI, according to one example implementation of the present invention. As shown, management UI 900 includes hyperlinks which, when selected, enable a user to establish/modify payment settings 902, user profile 904, and one or more definitions and/or dependencies of the custom settings 906, each of which will be described in greater detail below. In response to user interaction with UI 900 (i.e., selection of one or more of hyperlinks 902, 904, 906), management services 308 generates another UI in which the user can make the desired modifications.

Having introduced an example UI 900 for reference, the method of FIG. 8 begins with block 802 wherein controller(s) 302 receives an indication to invoke management services 308. According to one example embodiment, the indication is generated in response to user selection of settings button 718 from the main UI 700. In response, management services 308 generates a UI 900 to provide the user with an interface to create, modify and/or remove elements from user account information 318, block 804. More specifically, as presented above, UI 900 enables the user to manage payment information 902, user profile (904) and/or custom settings (906).

If, in block 806, an indication is received to modify payment authorization information, management services 308 provides the user with the current and/or payment authorization settings in user-manipulable fields, block 808. Providing the current and/or default settings in user-manipulable fields enables the user to modify select elements of the payment authorization process.

In block 810, management services 308 determines whether modification to the current and/or default payment authorization information has been made and, if so, updates the user account information to reflect the new information, block 812.

If, in block 814, an indication is received to modify the user profile information, management services 308 provides the user with the current user profile information in user-manipulable fields, block 816. In addition to the foregoing method of invocation, controller(s) 302 may well selectively invoke the user profile modification process upon the initial access of a heretofore unregistered user for the purpose of account registration. Presentation of the current user profile information in user-manipulable fields enables a user to update select ones of the user profile information. The process continues with block 810, wherein management services 308 determines whether user modification to the user profile information has been received and, if so, updates the user account information to reflect the new information, block 812. An example UI facilitating modification to user profile information is provided with reference to FIG. 10.

Figure 10:
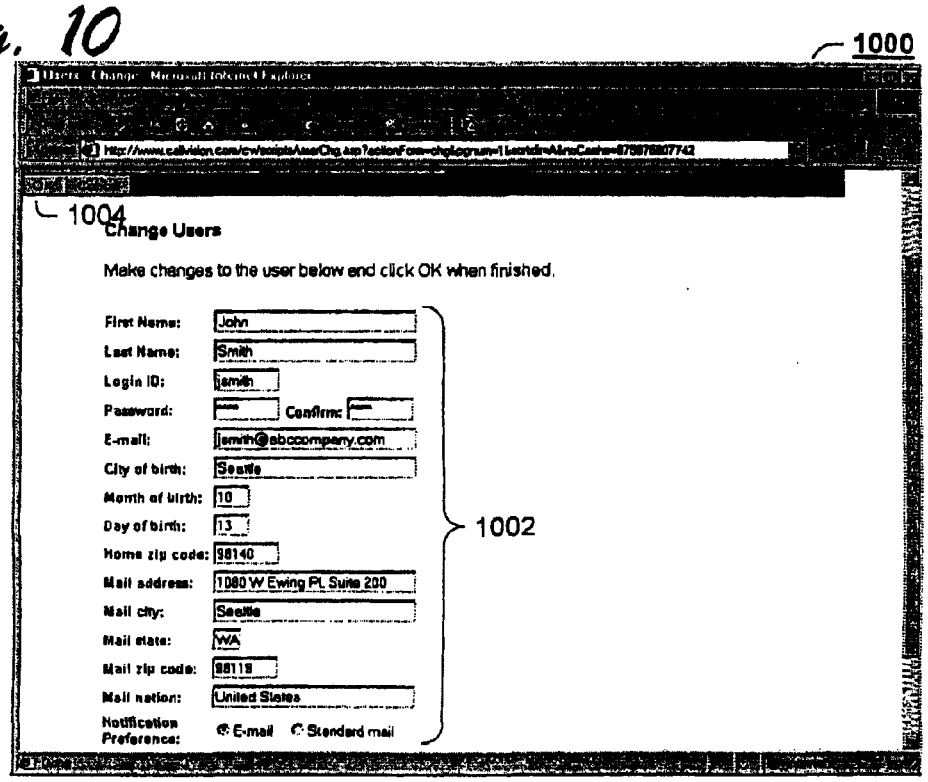
FIG. 10 is a graphical representation of an example UI enabling a user to provide user profile information, according to one implementation of the present invention.

FIG. 10 graphically represents an example UI 1000 wherein a user can provide/update user profile information. As shown, the UI 1000 includes one or more user-manipulable fields 1002 in which the user(s) 102(a) . . . 102(n) can provide requested user profile information. According to one implementation, the requested user profile information is defined by EBPAP agent 110. In an alternate embodiment, the user profile information requested is established by one or more billers (104(a) . . . 104(n)) which utilize the resources of EBPAP agent 110 as a service to their customers (e.g., one or more users 102(a) . . . 102(n)). As shown, the user provides the information requested in fields 1002 and selects the ok 1004 button, when finished. In accordance with one implementation, failure to provide all of the requested information results in an error message, requesting that each of the fields be completed.

If, in block 818 of FIG. 8, management services 308 receives an indication to modify one or more of the custom settings (906), management services 308 presents the user with a list of one or more customizable settings, block 820. In block 822, based on user selection of the one or more customizable settings, management services 308 presents the user with user-manipulable fields to define or modify current definition of the selected one or more settings. The process continues with block 810 wherein management services determines whether any user modifications have been made and, if so, updates the user account information to reflect the modifications, block 812. An example of UIs facilitating such customization is provided with reference to FIGS. 11A through 11D.

Figure 11A:
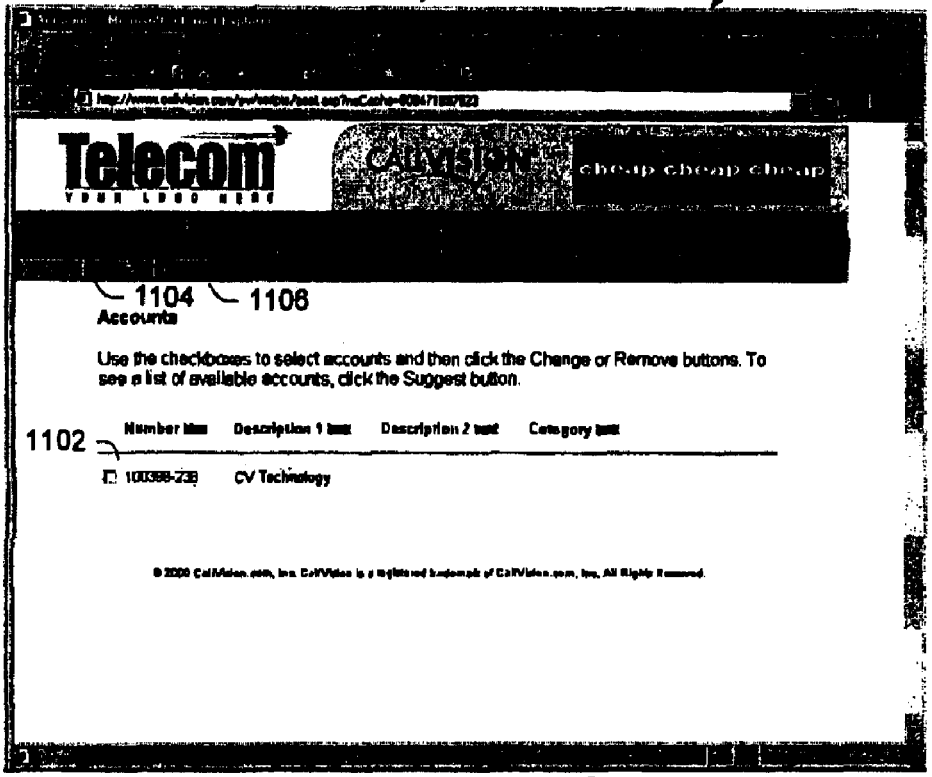
FIGS. 11A through 11D provide graphical representations of example UIs enabling a user to customize billing information definitions, dependencies, categories, rate plans, and the like, in accordance with one aspect of the present invention.
Figure 11B:
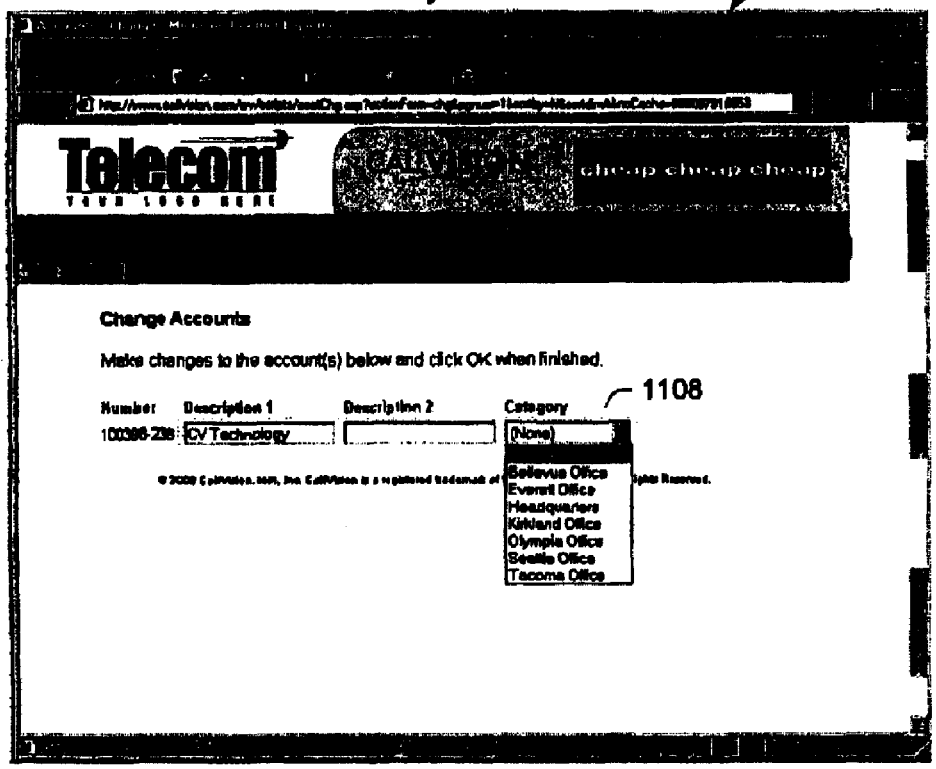

Recall from FIG. 9, management services 308 facilitates user definition of a number of billing information elements and dependencies (e.g., 906). FIG. 11A illustrates an example UI 1100 facilitating user modification/removal of billing accounts, in accordance with one aspect of the present invention. As shown, UI 1100 displays accounts 1102 for which the user is authorized, along with user-modifiable descriptions of the accounts and dependency categories. UI 1100 enables an authorized user(s) 102(a) . . . 102(n) to change 1104 description(s) and/or category dependency definitions, or remove 1106 the account(s) from the list. In accordance with one example implementation, presented in FIG. 11B, illustrated by an example UI 1110, the user-manipulable fields may well contain pull-down menus of pre-populated options 1108. According to one exemplary embodiment, the pull-down menu 1108 is populated with user-defined information (i.e., dependency categories). Modification to description and category dependency definitions enables a user to customize analysis protocol(s) and/or report format(s) to reveal the desired information in a presentable format. Indeed, EBPAP agent 110 enables a user to particularly define analysis parameters (e.g., statistical (mean, max, min, variation), geographic distribution, account distribution, department distribution, etc.) and information parameters in defining an analysis protocol—a level of user control heretofore unavailable in the prior art.

Figure 11C:
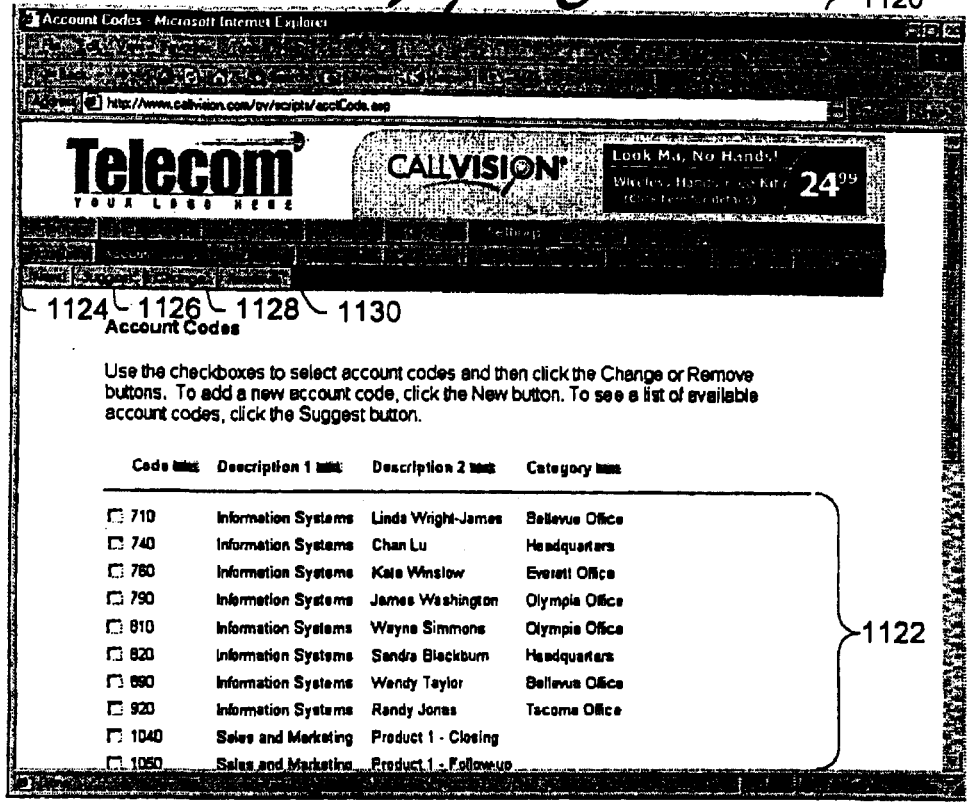

FIG. 11C illustrates an example UI facilitating creation, modification and/or removal of account codes, according to one aspect of the present invention. As shown, UI 1120 illustrates a number of account codes 1122, with corresponding description definition fields and a category dependency definition field. A menu bar is provided wherein a user may elect to create a new 1124 account code, suggest 1126 account code settings, change 1128 the definition of an existing account code, and/or remove 1130 account codes from the list of available codes.

Figure 11D:
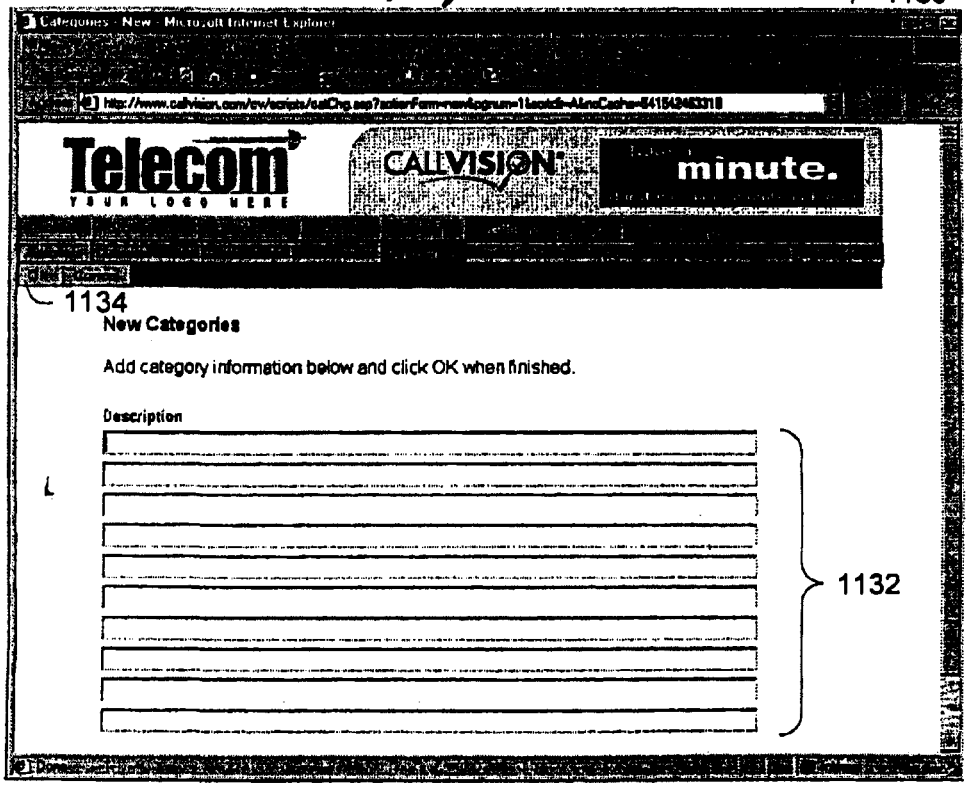

FIG. 11D illustrates an example UI 1130 facilitating user-defined categories, in accordance with one aspect of the present invention. As shown, UI 1130 includes a number of user-manipulable fields 1132 wherein a user may provide a description for a new account category. In accordance with the illustrated embodiments, account information is categorized by office location (e.g., Redmond, Seattle, Bellevue, etc.) and UI 1130 enables user-defined modification to the category listing, as well as creation of additional category types, e.g., job classification, department name, employee name, project identifier, job identifier, cost center identifier, and the like. In this regard, EBPAP agent 110 in general, and management services 308 in particular, facilitate unprecedented control over billing information, providing for the user-defined analysis and reporting of the present invention. Once the fields have been completed, the user selects the ok 1134 button to continue with the process.

Automated, Secure Password Generation and Reissuance

Figure 12:
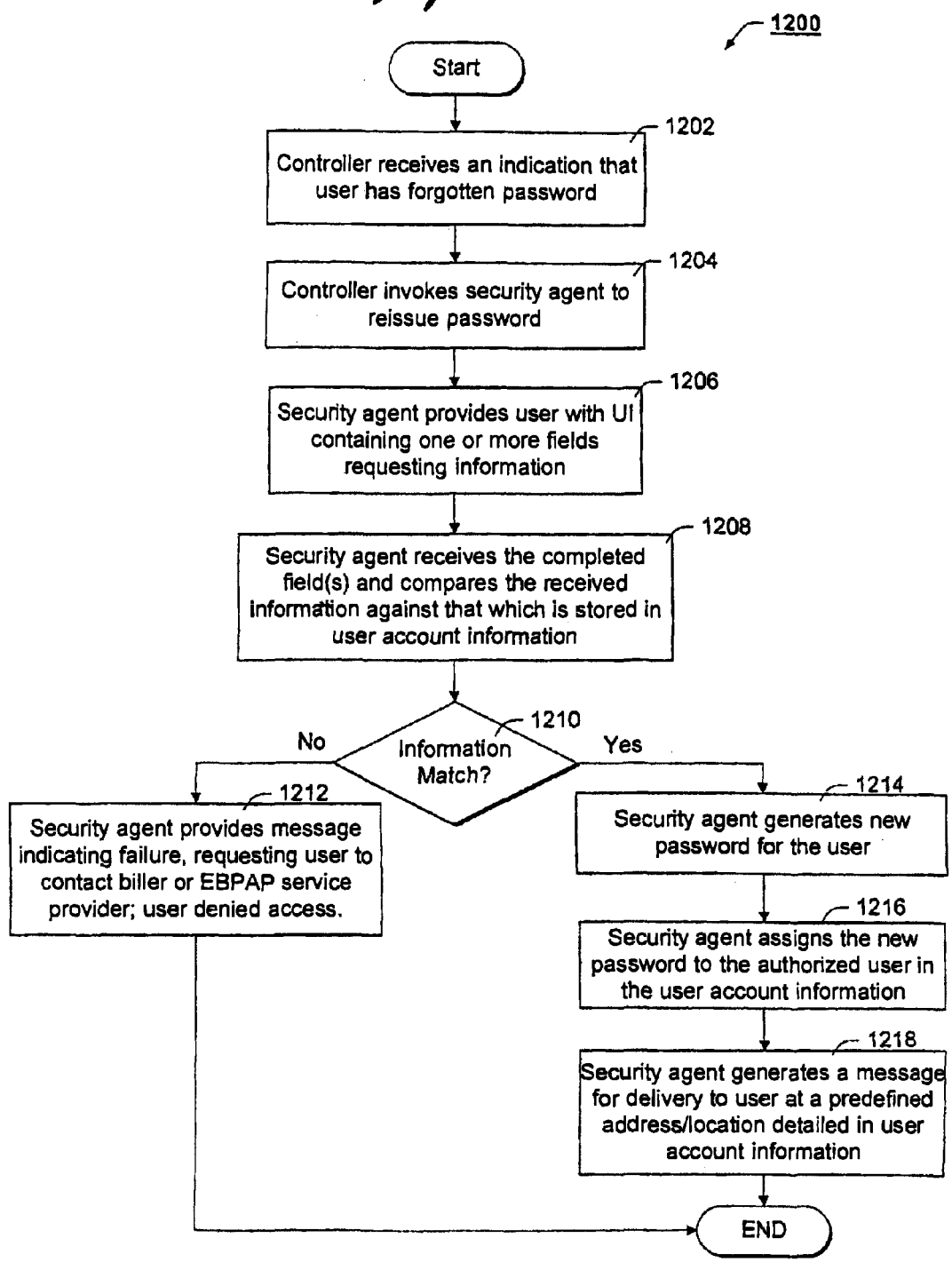
FIG. 12 is a flow chart of an example method for the secure, automatic reissuance of a forgotten password, in accordance with one aspect of the present invention.

FIG. 12 illustrates a flow chart of an example method 1200 for automatically generating and securely reissuing a password, in accordance with one aspect of the present invention. As shown, the method begins with block 1202 wherein controller(s) 302 receives an indication from UI 326 that a user is asserting they have forgotten their password. In block 1204, controller(s) 302 selectively invokes an instance of security agent 310 to verify that the asserting user is, indeed, an authorized user and, if so, to securely reissue a new password to the user.

In block 1206, to verify the authenticity of the user, security agent 310 provides the user with a UI containing one or more fields requesting personal information. According to one implementation, the personal information requested corresponds to at least a subset of information collected from the authorized user during the initial registration process. An example of just such a UI is presented with reference to FIG. 13.

Figure 13:
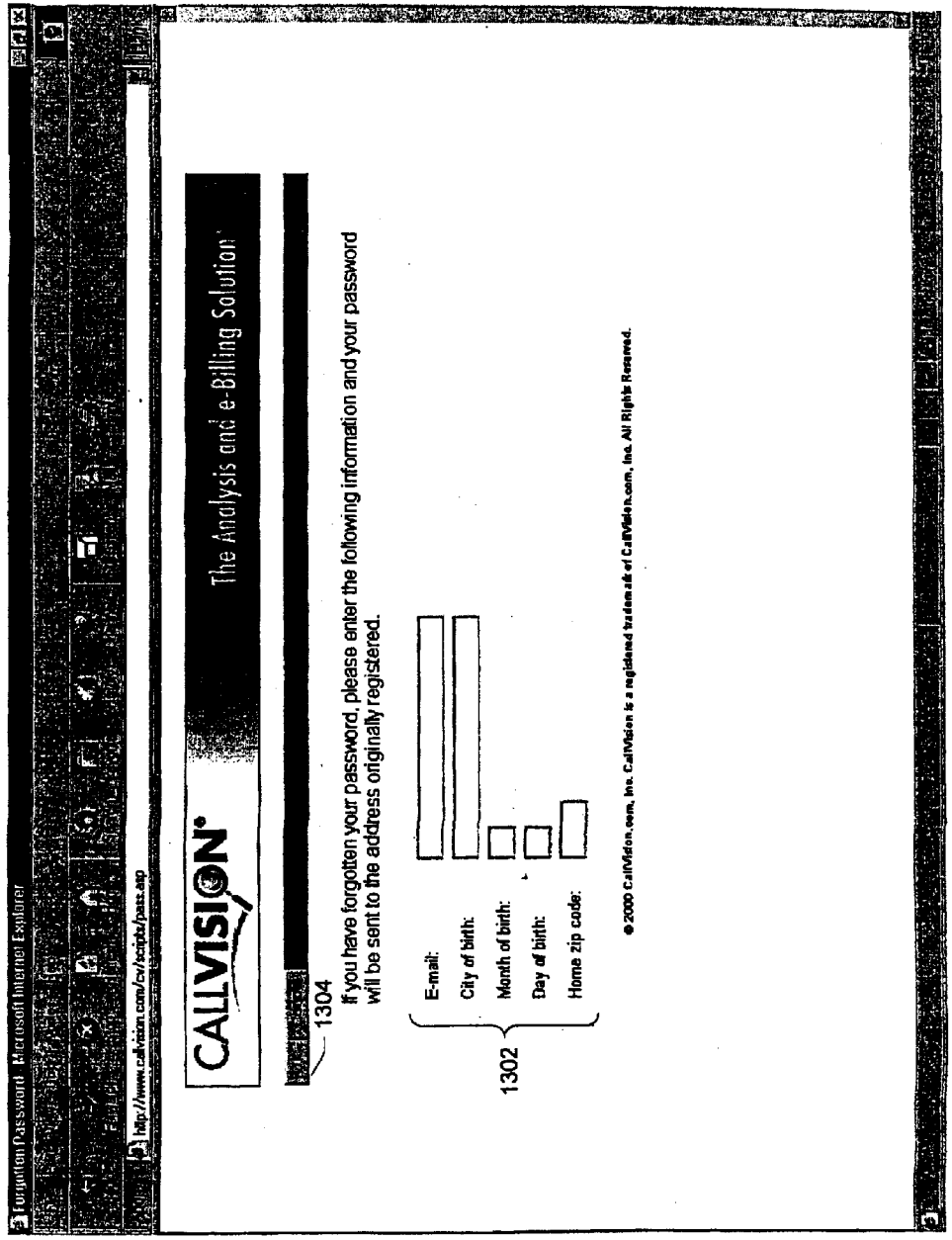
FIG. 13 is a graphical representation of an example UI facilitating the secure, automatic reissuance of a forgotten password, according to one example implementation.

Turning briefly to FIG. 13, a graphical representation of a user interface (UI) 1300 querying the user requesting password reissuance is presented, according to one implementation of the present invention. In accordance with the illustrated example embodiment, UI 1300 provides one or more fields 1302 in which the user is requested to provide some personal information to enable security agent 310 to verify the identity of the user requesting password reissuance. Once the fields have been completed, the user selects the ok 1304 button to continue with the process.

Returning to FIG. 12, once the requested information is provided, security agent 310 compares the information provided against the information contained in the user account, block 1208. In block 1210, security agent 310 determines whether the information provided is a match. If not, security agent 310 issues a message to the requesting user that the password generation has failed, indicating that the user must contact a biller, financial institution, and/or the EBPAP service provider to re-activate account access, as the accessing user is denied access to EBPAP agent 110, block 1212. According to one example implementation, security agent 310 logs the fact that a failed attempt at password reissuance has occurred with the particular account. After a certain number of failed attempts have been exceeded, security agent 310 may block any future access to the particular account, instead requesting the user to contact customer service of the biller, financial institution, or EBPAP service provider for a new account/password.

If, however, in block 1210 security agent 310 receives accurate information from the user, security agent 310 automatically generates a new password for the user, block 1214. According to one implementation, security agent 310 generates a random combination of numbers and letters of a pre-defined length and assigns the new password to the authorized user in the user account, block 1216. In block 1218, security agent 310 generates a message for delivery to the user at a pre-defined address/location. According to an exemplary implementation, security agent 310 generates an email message including the new password and sends the message to an email address identified in the user account. It will be appreciated that alternate forms of communication may well be substituted, however, without deviating from the spirit and scope of this aspect of the present invention.

Analysis and Reporting Services

FIG. 14 illustrates a flow chart of an example method 1400 for customizing an analysis and report profile utilizing the resources of analysis and report generation engine 306, according to one example embodiment of the present invention. As shown, the method begins with block 1402 where, in response to a received indication, controller(s) 302 invokes an instance of analysis and report generation engine 306. In accordance with the illustrated example embodiment, the indication is generated in response to user interaction with a UI. As introduced above, elemental features of the EBPAP agent 110 may be selectively invoked from any of the plurality of UIs described herein.

In block 1404, analysis and report generation engine 306 provides the requesting user with a UI, from which the user can elect to create, modify or remove an analysis/report. In block 1406, a list of available analyses/reports comprising the user's analysis and report profile is presented to the user within the UI. An example of a suitable UI facilitating management of the analysis and report profile is presented with reference to FIG. 15.

FIG. 15 illustrates an example UI facilitating management of the analysis and report profile using analysis and report generation engine 306, according to one example implementation of the invention. As shown, UI 1500 includes a pull-down listing 1502 of analysis and/or reports of the analysis and report profile, a number of user-manipulable fields 1504 reflecting analysis and/or report parameters and, in accordance with the illustrated example embodiment, what re-rating value 1506 is to be applied. Using the UI 1500, a user can modify any of the identified parameters to tailor the named analysis/report to suit the individual needs of each user. Once the parameters have been modified, the user selects the ok 1508 button to continue with the process.

In block 1408, analysis and report generation engine 306 determines whether an indication to create a new analysis protocol and/or report format has been received. If so, analysis and report generation engine 306 provides the requesting user with a UI including current billing information categories and dependencies in a number of user-manipulable fields, wherein the user can modify any of the settings to design an analysis protocol and/or reporting format, block 1410. An example UI facilitating analysis protocol and/or report format design is presented with reference to FIG. 16.

FIG. 16 illustrates an example UI facilitating analysis protocol and/or report format design, in accordance with one example embodiment of the present invention. As shown, UI 1600 includes a field for naming the report (and/or analysis protocol) 1602, a plurality of user-manipulable fields comprising current billing information category definitions and/ or dependencies 1604 from which the user can tailor a custom analysis protocol and/or report format, and a field for defining a re-rating value 1606 (if any). Once the fields have been completed, the user selects the ok 1608 button to continue with the process.

In block 1412, analysis and report generation engine 306 receives an indication from the user whether the appropriate billing account definitions and/or dependencies currently exist with which to design the custom analysis protocol and/ or report format. If not, the process continues with block 818 of FIG. 8. If, however, the billing information definitions and dependencies are sufficient, analysis and report generation engine 306 creates a new analysis protocol and/or report format for inclusion in the analysis and report profile based, at least in part, on the user interaction with the design UI 1600, block 1414.

In block 1416, upon receiving the new analysis protocol/ report format, analysis and report generation engine 306 may well perform some verification diagnostics to ensure that the proposed protocol/format meets a minimum threshold of logic. According to one example implementation, for example, analysis and report generation engine 306 merely determines whether the proposed name of the protocol/report already exists; whether the proposed use of the definitions/ dependencies is permissible; and the like.

In block 1418, analysis and report generation engine 306 updates the analysis and report profile to reflect the newly created protocol/report.

In block 1420, analysis and report generation engine 306 determines whether an indication to modify an existing analysis protocol/report format has been received. If so, analysis and report generation engine 306 provides the user with management UI 1500 and updates the analysis/report definitions in response to user selections of the user-manipulable fields (1502, 1504, 1506), block 1422.

In block 1424, analysis and report generation engine 306 determines whether an indication to remove an existing analysis/report has been received from a user. If so, analysis and report generation engine 306 removes the analysis protocol and associated reports and updates the analysis and report profile of the user account information upon receipt of a confirmation from the user, block 1426. Alternatively, in block 1428, analysis protocols and report formats comprising the analysis and report profile will remain for selective invocation by the user.

Figure 17A:
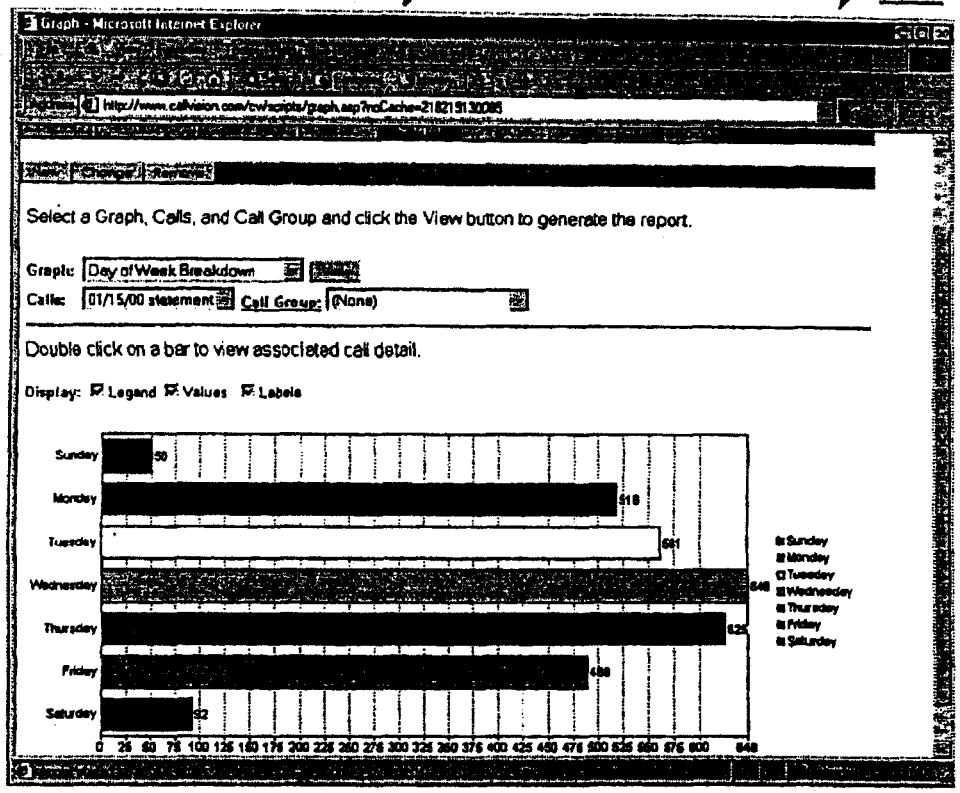
Figure 17B:
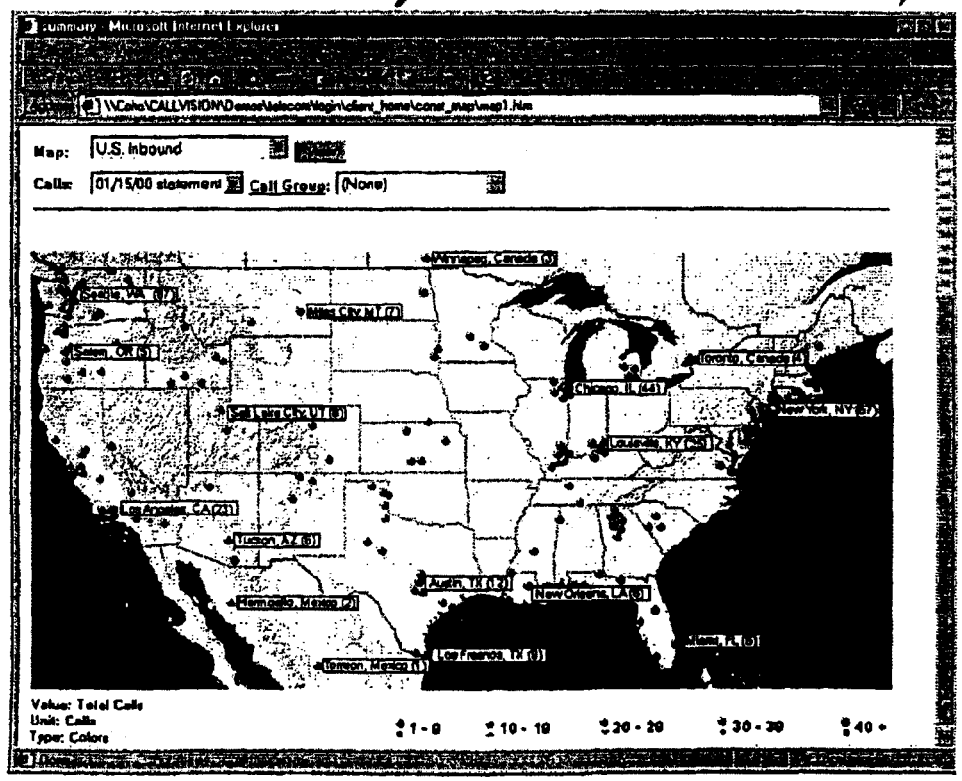
Figures 17C, 17D:
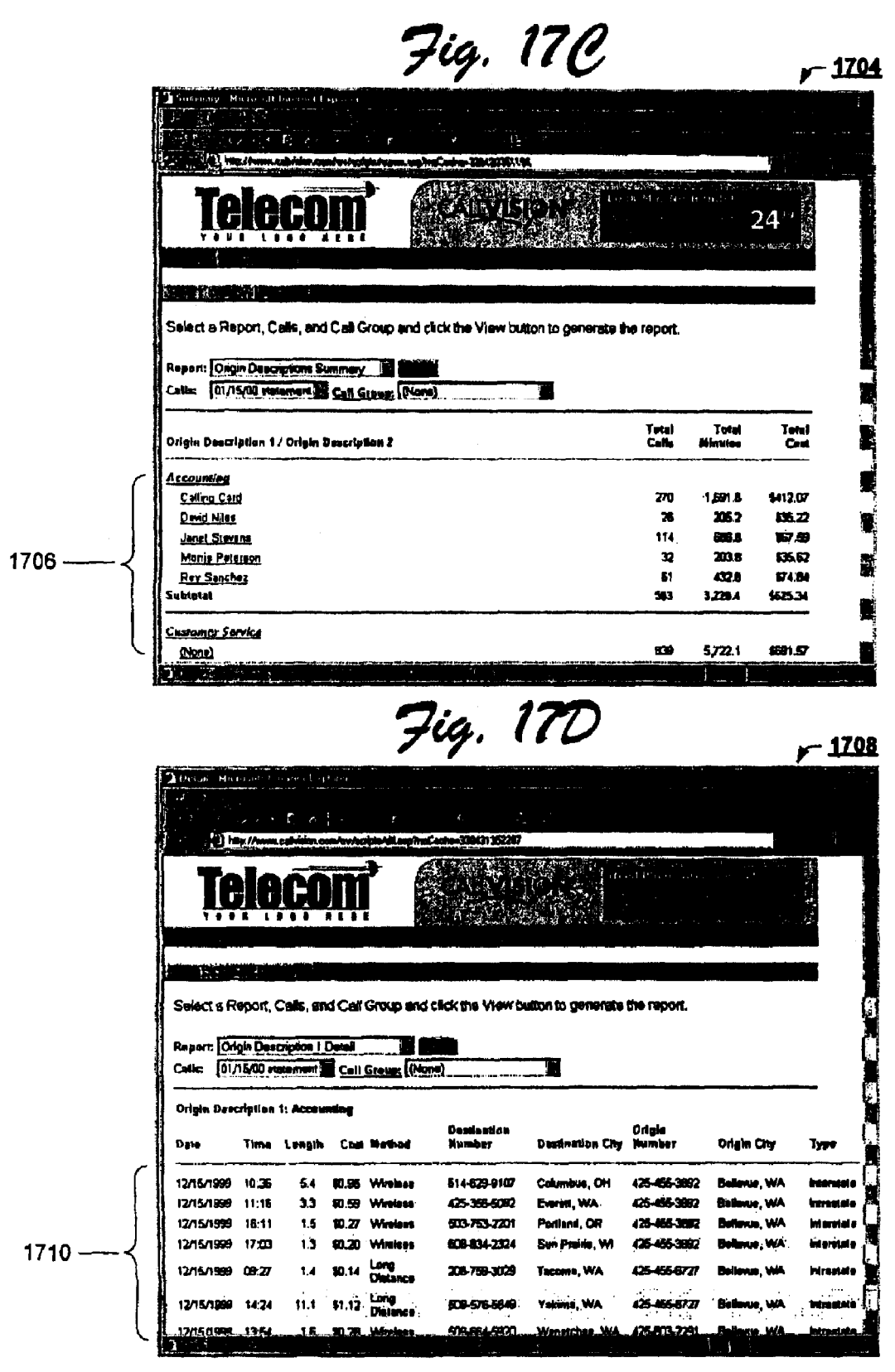

FIGS. 17A through 17D illustrate example reports generated in accordance with the teachings of the present invention. According to one implementation, analysis and report generation engine 306 generates graphs and/or reports in accordance with user-defined settings and criteria upon invocation of the graph button 716, on UI 700. As shown, FIG. 17A depicts UI 1700, a bar chart of total call duration information broken down by the day of the week over a user-defined period. It is important to note that the user, not the biller, financial institution or intermediary service provider defines the report and/or graph formats. FIG. 17B depicts UI 1702, geographical distribution of call information 1704 directly on a map of the region of interest. FIG. 17C depicts UI 1704, a summary report of call information, including line item (1706 for the accounting department reference) summary. According to one implementation, the line item 1706 is implemented as an iconic selector (denoted by, for example, an underline, alternate textual color, etc.) if additional detailed information is available. If a user were to select a line item 1706, a detailed information report 1708 of the information 1710 is displayed, such as the one depicted in FIG. 17D. It is to be appreciated that, by enabling a user to define the report and/or graph formats at the source of the information, the user can eliminate the step of having to download (or worse, manually enter) the billing information for manipulation on the local computer. None of the static, proprietary prior art EBPP systems provide for user-defined report formatting and generation, much less user-defined analysis capability.

User Controlled Re-Rating of Billing Information

Figure 18:
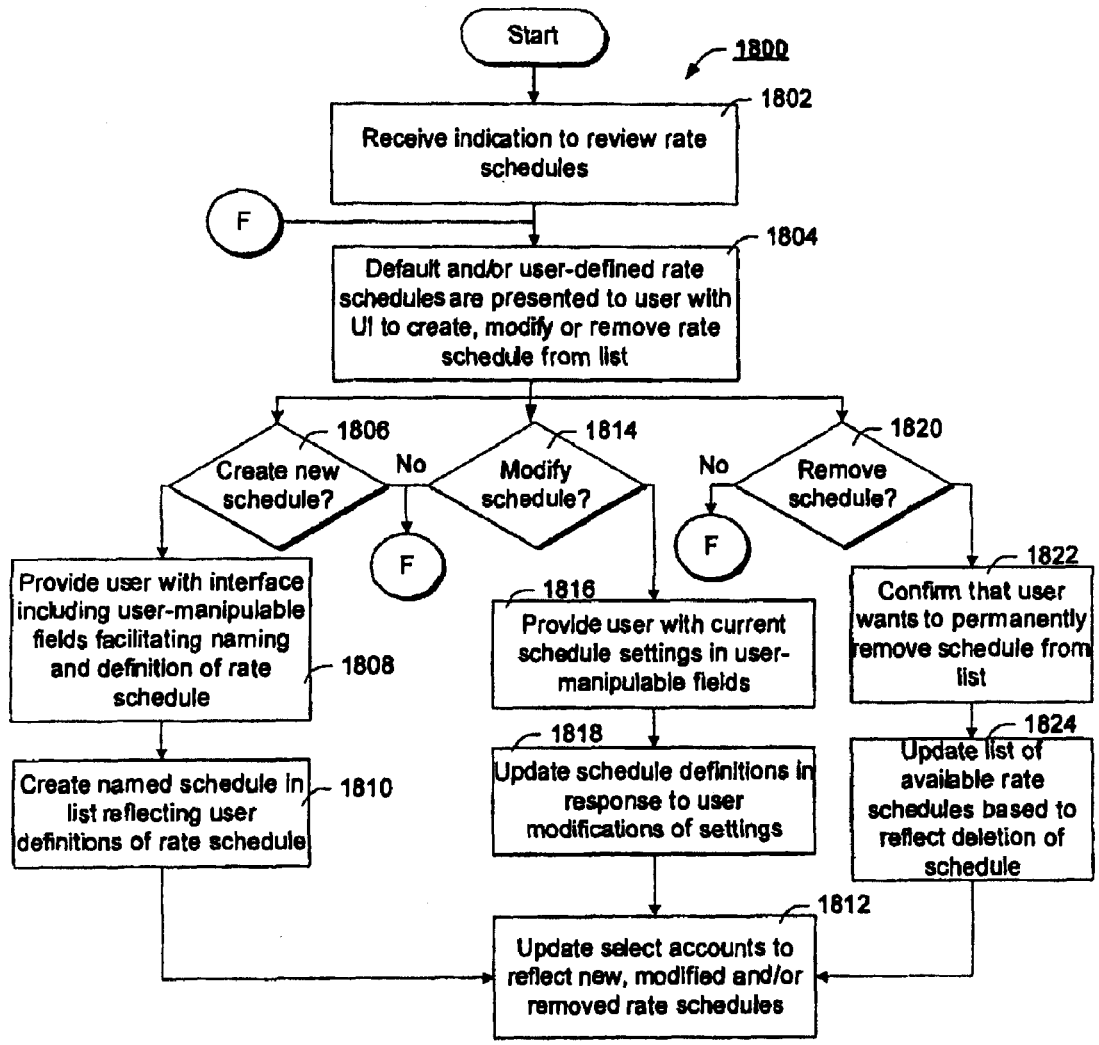
FIG. 18 is a flow chart of an example method for user-defined re-rating of billing information, in accordance with one aspect of the present invention.

FIG. 18 illustrates a flow chart of an example method 1800 facilitating user definition of rating schedules and re-rating of billing information, in accordance with one aspect of the present invention. As introduced above, re-rating enables a primary user, i.e., a local provider of services (e.g., executive office suite) to re-rate (often, mark-up) the cost of services before presentation to a secondary user (or, end-user). EBPAP agent 110 facilitates the definition and re-rating of such services by the intermediary (i.e., primary user of the EBPAP, as opposed to a secondary, or end-user, which may or may not utilize the EBPP services of EBPAP). In accordance with the illustrated example embodiment of FIG. 18, the method begins upon receiving an indication that a user desires to re-rate billing information, block 1802. In response, controller(s) 302 selectively invokes an instance of management services 308, which provides the authorized user with a UI enabling the user to create, modify or remove rate schedules from a listing of rate schedules which may be applied to select secondary user(s), block 1804. An example of a suitable UI is presented with reference to FIG. 19.

Figure 19:
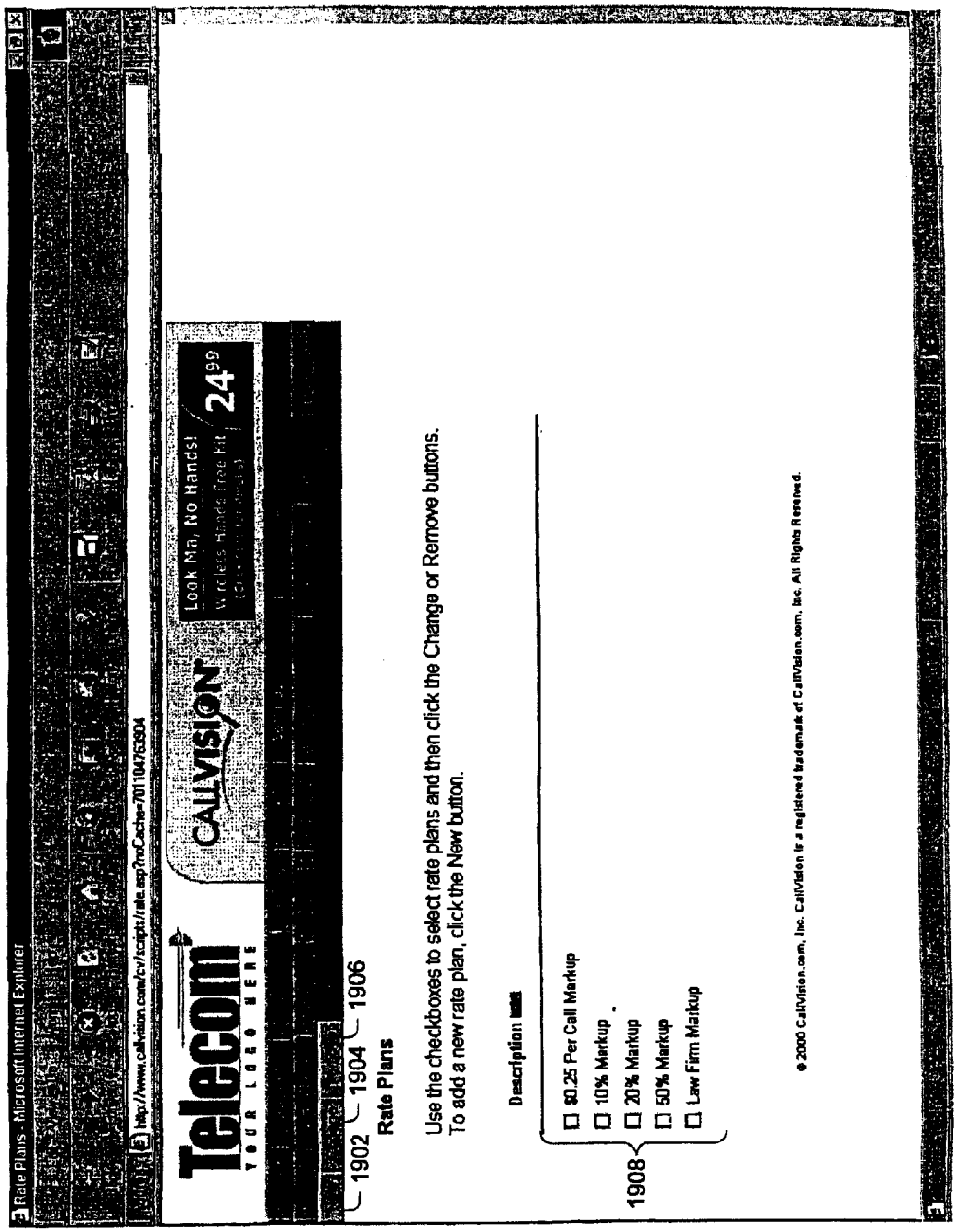
FIG. 19 is a graphical representation of an example UI facilitating user re-rating of billing information.

Turning briefly to FIG. 19, a graphical illustration of an example UI to create, modify or remove rate schedules from EBPAP agent 110 is provided, according to one example implementation. As shown, UI 1900 is comprised of a menu bar enabling a user to create new 1902 rate schedules, change 1904 existing rate schedule definitions or remove 1906 rate schedules from the list 1908 of available rate schedules. Selection of the new button 1902 from the menu bar causes management services 308 to invoke a UI enabling the primary user to define a new rate schedule. According to one implementation (not shown), the UI includes fields wherein the user can define one or more of the name of the rate schedule, a method of calculating the re-rating (i.e., a surcharge percentage to be added to base billing information, a fixed-fee surcharge to be added to base billing information, dynamically adjustable surcharge information based on time of call, length of call, call origin and/or call destination, the services used (e.g., analog services, digital services), bandwidth used, and the like), when the re-rating is to be applied (i.e., based on time of day, day of week, month, destination number, origin number, and the like), and to which secondary user(s) the re-rating schedule is to be applied. Similarly, selection of the change button 1904 enables a user to modify one or more of the above settings associated with the rate schedule.

Selection of the remove button 1906 enables a user to remove one or more identified rate schedules from the rate schedule list 1908.

Returning to FIG. 18, the process continues by determining what function the primary user has selected from the rating UI 1900. If, in block 1806, the user has decided to create a new rating schedule, the user is provided with an interface including user-manipulable fields to facilitate naming of the new rate schedule, identification of the manner in which re-rating is to be applied, and, optionally, to which customers it will be applied, block 1808. In block 1810, management services 308 receives the primary user's definitions for the new rate schedule and adds the rate schedule to the list of available rate schedules. In block 1812, management services 308 updates the user account information 318 with the rate schedule information, and applies the new rate schedules to existing and future billing information associated with the primary user.

If, in block 1814, the user elects to change a rate schedule, management services 308 presents a UI to the user with the current definitions of the selected rate schedule, block 1816. In block 1818, in response to user modification of one or more parameters of the selected rate schedule, management services 308 updates the rate schedule definition in the user account information 316. The process continues with block 1812, wherein management services 308 applies the modified rate schedule to existing and future billing information associated with the primary user.

If, in block 1820, the user elects to remove a rate schedule from the list 1908 of rate schedules, management services 308 confirms that the user wants to permanently remove the rate schedule from the list, block 1822, before removing the rate schedule from the list. In block 1824, management services 308 updates the list of rate schedules to reflect deletion of the schedule, and the process continues with block 1812 wherein management services 308 updates select accounts to reflect the removed rate schedule.

Display Management

FIG. 20 graphically illustrates a detailed billing report 2000 incorporating an innovative paging feature/structure 2002 to enable a user to quickly locate a desired billing page, in accordance with one aspect of the present invention. As alluded to above, billing information may span tens to hundreds of pages, and an improved paging structure is needed to quickly traverse the pages to find a desired page. As shown with reference to FIG. 20, controller(s) 302 identifies the total number of pages to be displayed, and divides the total into even subsets of, for example, 10 page increments. If a user is interested in page 25, for example, the user selects a hyperlink associated with pages 20-30, whereupon the hyperlink "20" is replaced by hyperlinks to individual pages 21-29, with the original hyperlinks 10, 30, 40, etc. still displayed. It will be appreciated that such a paging structure enables a user to quickly "jump" to a desired page in fewer steps than prior art paging methods.

Although depicted in accordance with the EBPAP agent 110, it is to be appreciated that the paging structure of the present invention may well be applied to other systems such as, for example, a search engine, stand-alone applications (e.g., accounting and book-keeping applications), database systems, e-commerce retail sites, and the like. Such alternate implementations are anticipated within the scope and spirit of the present invention.

Alternate Embodiments

FIG. 21 is a block diagram of a storage medium having stored thereon a plurality of instructions including instructions to implement the teachings of the present invention, according to yet another embodiment of the present invention. In general, FIG. 21 illustrates a storage medium/device 2100 having stored thereon a plurality of executable instructions 2102 including at least a subset of which that, when executed, implement the EBPAP agent 110 of the present invention. When executed by a processor of a host system, the executable instructions implementing EBPAP agent 110 facilitate account management and analysis for any of a plurality of financial accounts including, but not limited to, telephone accounts, credit card accounts, utility bills, mortgage accounts, brokerage accounts, and the like.

As used herein, storage medium 2100 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 2100 need not be co-located with any host system. That is, storage medium/device 2100 may well reside within a remote server communicatively coupled to and accessible by an executing system. Accordingly, the software implementation of FIG. 21 is to be regarded as illustrative, as alternate storage media and software embodiments are anticipated within the spirit and scope of the present invention. Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed as new and desired to be protected by Letters Patent of the United States is:

1. A computing system facilitating electronic bill presentment and payment services for authorized users, the computing system comprising:

an analysis engine, to perform a customer-defined analysis on at least a subset of retrieved billing information associated with one or more billers and to generate an associated customer-defined report based, at least in part, on the customer-defined analysis; and a user interface, coupled to the analysis engine, to enable a customer to interact with and control the analysis engine, wherein the customer generates the customer-defined analysis using the user interface, the customer being different from the one or more billers, and wherein the analysis engine generates the customer-defined report in response to receiving an indication from the user interface.

2. A computing system according to claim 1, wherein the user interface enables a customer to interact with and control electronic bill presentment, analysis and payment services of the computing system.

3. A computing system according to claim 1, wherein the customer is authorized to selectively invoke the analysis engine, while another customer is authorized to make payments in satisfaction of an electronic bill.

4. A computing system according to claim 1, wherein the user interface enables the customer to define one or more fields of a data structure comprising billing information.

5. A computing system according to claim 4, wherein the user interface enables the customer to define analysis protocols utilizing billing information from one or more user-defined fields.

6. A computing system according to claim 5, wherein one or more of the customer-defined analysis protocols are selectively invoked by the customer via the user interface.

7. A computing system according to claim 1, wherein the analysis engine generates the customer-defined report in accordance with a customer-defined format based, at least in part, on the analysis of the retrieved billing information.

8. A computing system according to claim 1, wherein the billing information is selectively retrieved from one or more of a local data store and a remote data store, communicatively coupled to the computing system via a network.

9. A computer-readable medium encoded with a plurality of executable instructions for implementing an electronic bill presentment, analysis and payment (EBPAP) system including an analysis engine, wherein the executable instructions are arranged to perform actions including:

selectively executing a customer-defined analysis of one or more attributes of billing information received from billers for presentment and payment authorization;

receiving a customer indication to generate one or more reports, the customer being different from the billers; and in response to receiving the customer indication, generating the one or more reports in accordance with associated customer-defined formats reflecting a result of said analysis.

10. A computer-readable medium according to claim 9, wherein the EBP AP system is implemented by a telecommunications company, enabling customers of the telecommunications company to access and analyze billing information via a telecommunications company server.

11. A computer-readable medium according to claim 9, wherein the EBP AP system is implemented by an independent service provider, enabling customers of the service provider to access and analyze billing information from affiliated billers using one or more of the independent service provider's servers.

12. A computer-readable medium according to claim 9, wherein the EBP AP system is invoked on a server by a customer from one or more of a kiosk, personal computer, communications device, personal digital assistant, and a thin-client device via a communicatively coupled data network.

13. A computer-readable medium according to claim 9, wherein the EBP AP system is implemented by a billing company, enabling one or more of a customer and a customer's customer of the billing company to access and analyze billing information via a billing company server.

\* \* \* \* \*